(12) United States Patent
Grunnet-Jepsen et al.

(10) Patent No.: US 9,992,474 B2
(45) Date of Patent: Jun. 5, 2018

(54) STEREO DEPTH CAMERA USING VCSEL WITH SPATIALLY AND TEMPORALLY INTERLEAVED PATTERNS

(71) Applicant: Intel Corporation, Santa Clara, CA (US)

(72) Inventors: Anders Grunnet-Jepsen, San Jose, CA (US); Krishna Swaminathan, Santa Clara, CA (US); Leonid M. Keselman, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 152 days.

(21) Appl. No.: 14/998,253

(22) Filed: Dec. 26, 2015

(65) Prior Publication Data
US 2017/0186166 A1    Jun. 29, 2017

(51) Int. Cl.
*G06T 7/00*    (2017.01)
*H04N 13/00*    (2018.01)
(Continued)

(52) U.S. Cl.
CPC ......... *H04N 13/0022* (2013.01); *G06T 7/521* (2017.01); *G06T 7/593* (2017.01);
(Continued)

(58) Field of Classification Search
CPC ............. H04N 13/0022; H04N 13/025; H04N 13/0242; G06T 7/0057
See application file for complete search history.

(56) References Cited

U.S. PATENT DOCUMENTS

| | | |
|---|---|---|
| 2012/0051588 A1 | 3/2012 | McEldowney |
| 2015/0281671 A1 | 10/2015 | Bloom et al. |
| 2015/0362585 A1 | 12/2015 | Ghosh et al. |

FOREIGN PATENT DOCUMENTS

| | | |
|---|---|---|
| KR | 20120061002 | 6/2012 |
| WO | WO-2014/014838 | 1/2014 |

OTHER PUBLICATIONS

International Search Report & Written Opinion for Application No. PCT/US2016/056884, dated Jan. 25, 2017, 13 pages.

*Primary Examiner* — Huy T Nguyen
(74) *Attorney, Agent, or Firm* — Womble Bond Dickinson (US) LLP

(57) ABSTRACT

In accordance with disclosed embodiments, there are provided systems, methods, and apparatuses for implementing a stereo depth camera using a VCSEL projector with spatially and temporally interleaved patterns. For instance, a depth camera is described having therein a Vertical-Cavity Surface-Emitting Laser projector (VCSEL projector); in which the VCSEL projector embodies a VCSEL array, the VCSEL being comprised of a plurality of VCSEL elements divided into a plurality of individually addressable subsets of the plurality of VCSEL elements; processing circuitry to activate one or more of the individually addressable subsets of the plurality of VCSEL elements to cause the VCSEL projector to emit a plurality of infrared beams through a projection lens to form a projected pattern which is projected onto a scene; stereoscopic image capture devices to capture stereoscopic imagery from the scene having the projected pattern projected thereupon; and processing circuitry to determine depth to an object in the scene based on the captured stereoscopic imagery from the scene having the projected pattern represented therein as projected from the VCSEL projector. Other related embodiments are disclosed.

29 Claims, 13 Drawing Sheets

(51) Int. Cl.
*H04N 13/02* (2006.01)
*G06T 7/521* (2017.01)
*G06T 7/593* (2017.01)
(52) U.S. Cl.
CPC ....... *H04N 13/025* (2013.01); *H04N 13/0242* (2013.01); *G06T 2207/10012* (2013.01); *G06T 2207/10024* (2013.01); *G06T 2207/10152* (2013.01)

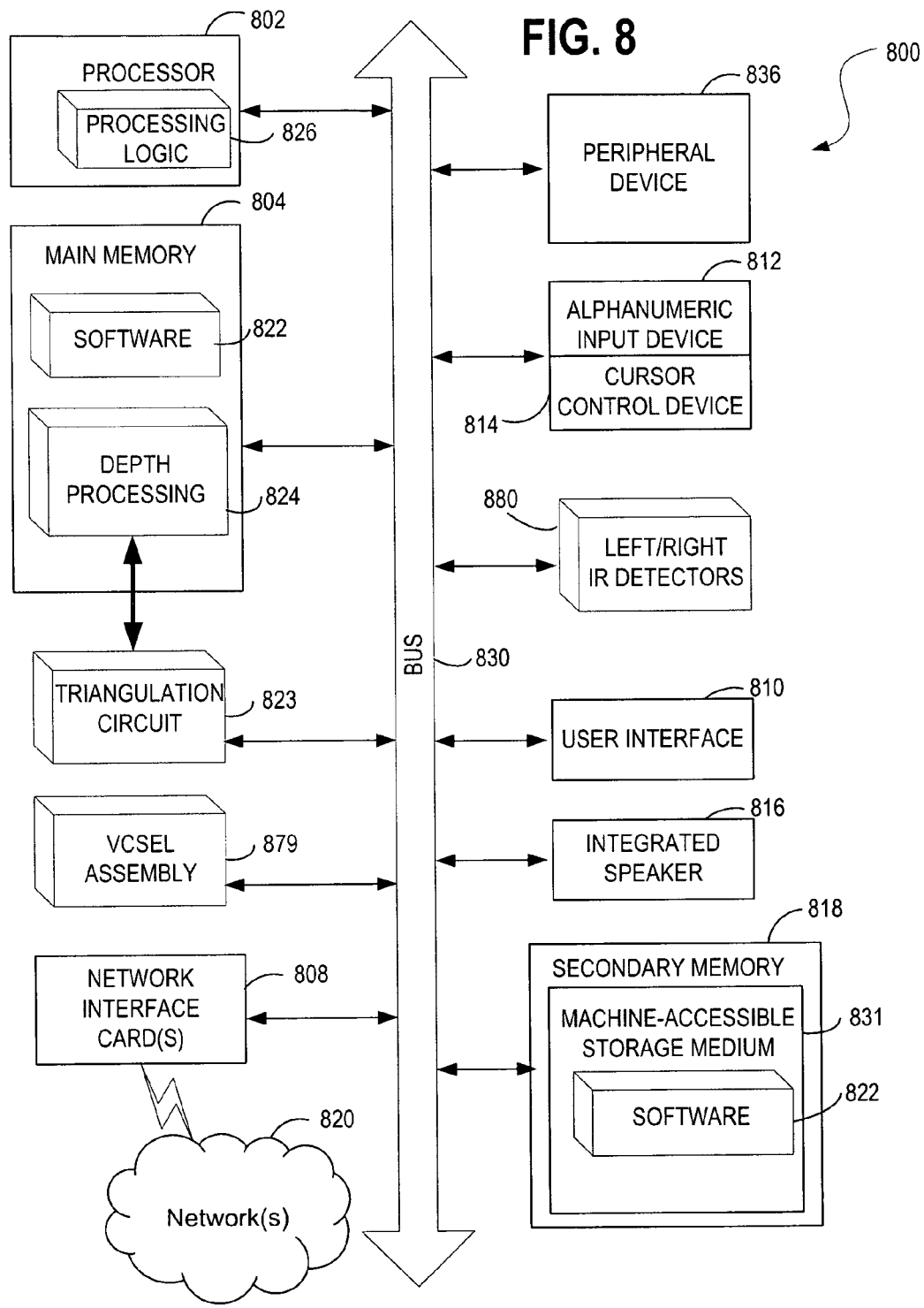

US 9,992,474 B2

STEREO DEPTH CAMERA USING VCSEL WITH SPATIALLY AND TEMPORALLY INTERLEAVED PATTERNS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of image capture devices such as cameras, and more particularly, to systems, methods, and apparatuses for implementing a stereo depth camera using a VCSEL (Vertical-Cavity Surface-Emitting Laser) projector with spatially and temporally interleaved patterns.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Conventional cameras capture a single image from a single optical focal point and are enabled to capture pixels corresponding to an object in a scene, but in so doing, such cameras lose the depth information for where within the scene that object is positioned in terms of depth or distance from the camera.

Conversely, stereo cameras have two or more lenses, either on the same or separate image sensors, and the two or more lenses allow the camera to capture three-dimensional images through a process known as stereo photography. With such conventional stereo cameras, triangulation is used to determine the depth to an object in a scene using a process known as correspondence. Correspondence presents a problem, however, of ascertaining which parts of one image captured at a first of the lenses correspond to parts of another image, captured at a second of the lenses. That is to say, which elements of the two photos correspond to one another as they represent the same portion of an object in the scene, such that triangulation may be performed to determine the depth to that object in the scene.

Given two or more images of the same three-dimensional scene, taken from different points of view via the two or more lenses of the stereo camera, correspondence processing requires identifying a set of points in one image which can be correspondingly identified as the same points in another image by matching points or features in one image with the corresponding points or features in another image.

Other three-dimensional (3D) processing methodologies exist besides correspondence based triangulation, such as laser time of flight and projection of coded light.

When determining depth to an object in a scene, the detectors need to receive light from the scene by which the objects may be observed such that depth can be determined. Many scenes, however, lack sufficient ambient light within the scene, especially as objects are further distant from the camera, or the scene observed by the camera is large, or where the natural light within the scene being imaged is scarce, such as is common with indoor environments.

Certain 3D imaging and depth sensing systems have incorporated a laser projector to improve correspondence processing by providing both assisted lighting of the scene as well as providing artificial texturing of the scene, however, the conventional solutions applied to 3D imaging and depth sensing systems suffer from a variety of drawbacks.

Fundamentally, there is a risk with regard to use of laser projection in 3D camera technologies, especially in the consumer space, due to the very simple fact that a laser may easily surpass a safety limit for their use and thus pose a very real threat of causing injury or even blindness to a human subject.

The present state of the art may therefore benefit from the systems, methods, and apparatuses for implementing a stereo depth camera using a VCSEL projector with spatially and temporally interleaved patterns as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 8 illustrates a diagrammatic representation of a machine in the exemplary form of a computer system, in accordance with one embodiment.

DETAILED DESCRIPTION

Figure 1A:
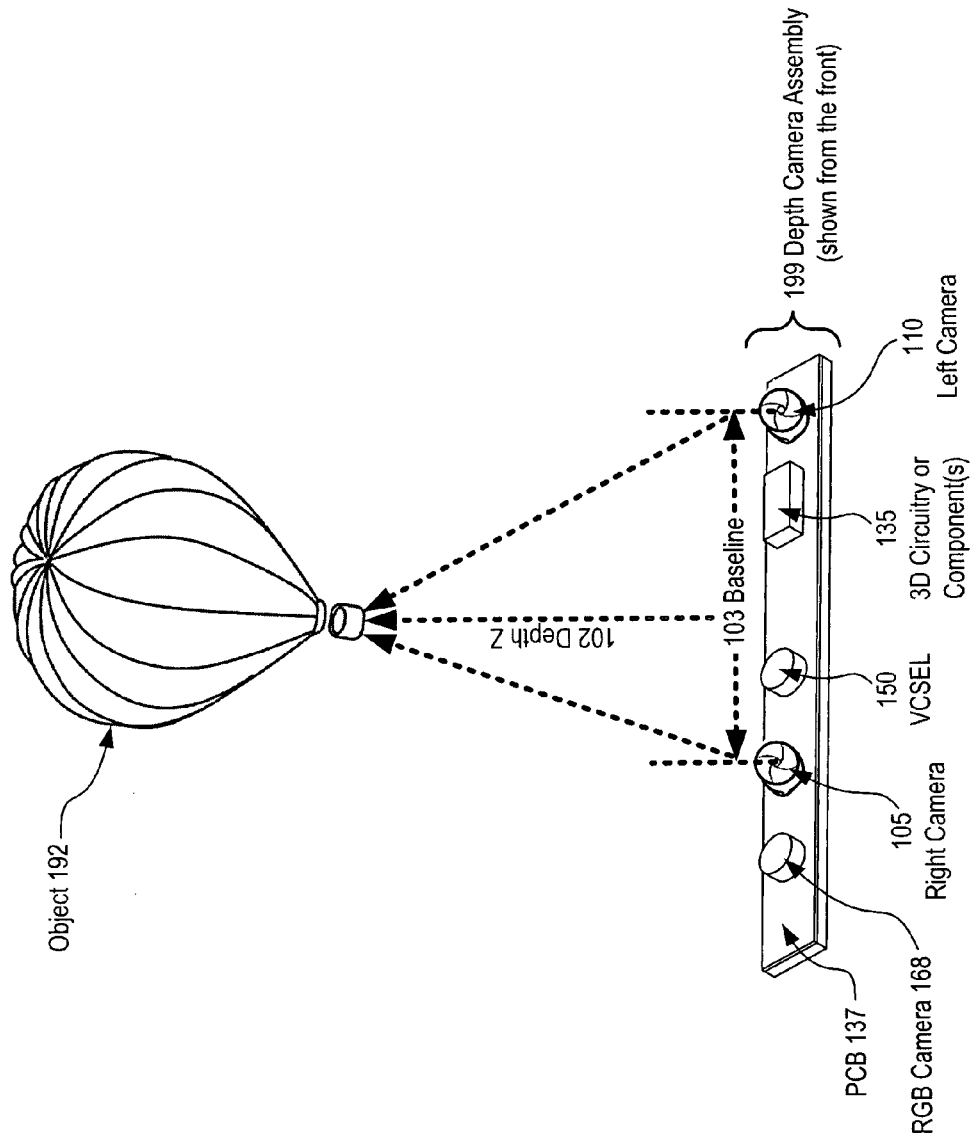
FIG. 1A illustrates an exemplary architecture in accordance with which embodiments may operate.

Described herein are systems, apparatuses, and methods for implementing a stereo depth camera using a VCSEL projector with spatially and temporally interleaved patterns. For instance, a depth camera is described having therein a Vertical-Cavity Surface-Emitting Laser projector (VCSEL projector); in which the VCSEL projector embodies a VCSEL array, the VCSEL being comprised of a plurality of VCSEL elements divided into a plurality of individually addressable subsets of the plurality of VCSEL elements; processing circuitry to activate one or more of the individually addressable subsets of the plurality of VCSEL elements to cause the VCSEL projector to emit a plurality of infrared beams through a projection lens to form a projected pattern which is projected onto a scene; stereoscopic image capture devices to capture stereoscopic imagery from the scene having the projected pattern projected thereupon; and processing circuitry to determine depth to an object in the scene based on the captured stereoscopic imagery from the scene having the projected pattern represented therein as projected from the VCSEL projector.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A illustrates an exemplary architecture in accordance with which embodiments may operate. In particular, there is depicted a depth camera assembly 199 having a printed circuit board (PCB) 137 upon where there are 3D circuitry or components 135, a VCSEL 150, an RGB camera 168, and a right camera 105 and left camera 110. The 3D circuitry or components 135 may include a processing component such as processing circuitry which may include, for instance, one or more CPUs, memory, busses, FPGAs, a triangulator, etc.

Note that the right camera 105 is depicted on the left hand side of the depth camera assembly 199 and the left camera 110 is depicted on the right hand side of the depth camera assembly 199 because when a camera is used to capture an image of the scene, the depth camera assembly 199 of the camera will be facing away from the user.

With so called "assisted" stereoscopic depth camera systems, the optical projector such as the VCSEL 150 component as depicted here is a critical component and the manner by which it is driven electronically and controlled during use may be equally important. The VCSEL 150 projector serves to illuminate the scene with a spatially varying pattern that helps to paint texture on the scene and aids in the stereoscopic matching between the left and right imagers. The depicted VCSEL 150 array projector as described herein provides many enhanced features to a depth sensing system including improved range, improved resolution, dynamic range optimization during use, and Signal to Noise Ratio (SNR) improvements.

Using the right camera 105 and left camera 110 of the stereoscopic depth camera, two images are captured.

The right camera 105 and left camera 110 form a stereoscopic depth camera system, by which the two cameras are separated by a distance called the baseline 103, and are pointed in the same direction, as shown. The object 192 is at depth Z (element 102) as observed by the cameras.

The two cameras (right camera 105 and left camera 110) are a known and fixed distance from each other, establishing the baseline 103. Depending on the distance to the object 192 at depth Z (element 102) the object will shift by a different amount for each of two separate images taken by the right camera 105 and left camera 110 respectively.

This shift of the object in the scene is called disparity.

Figure 1B:
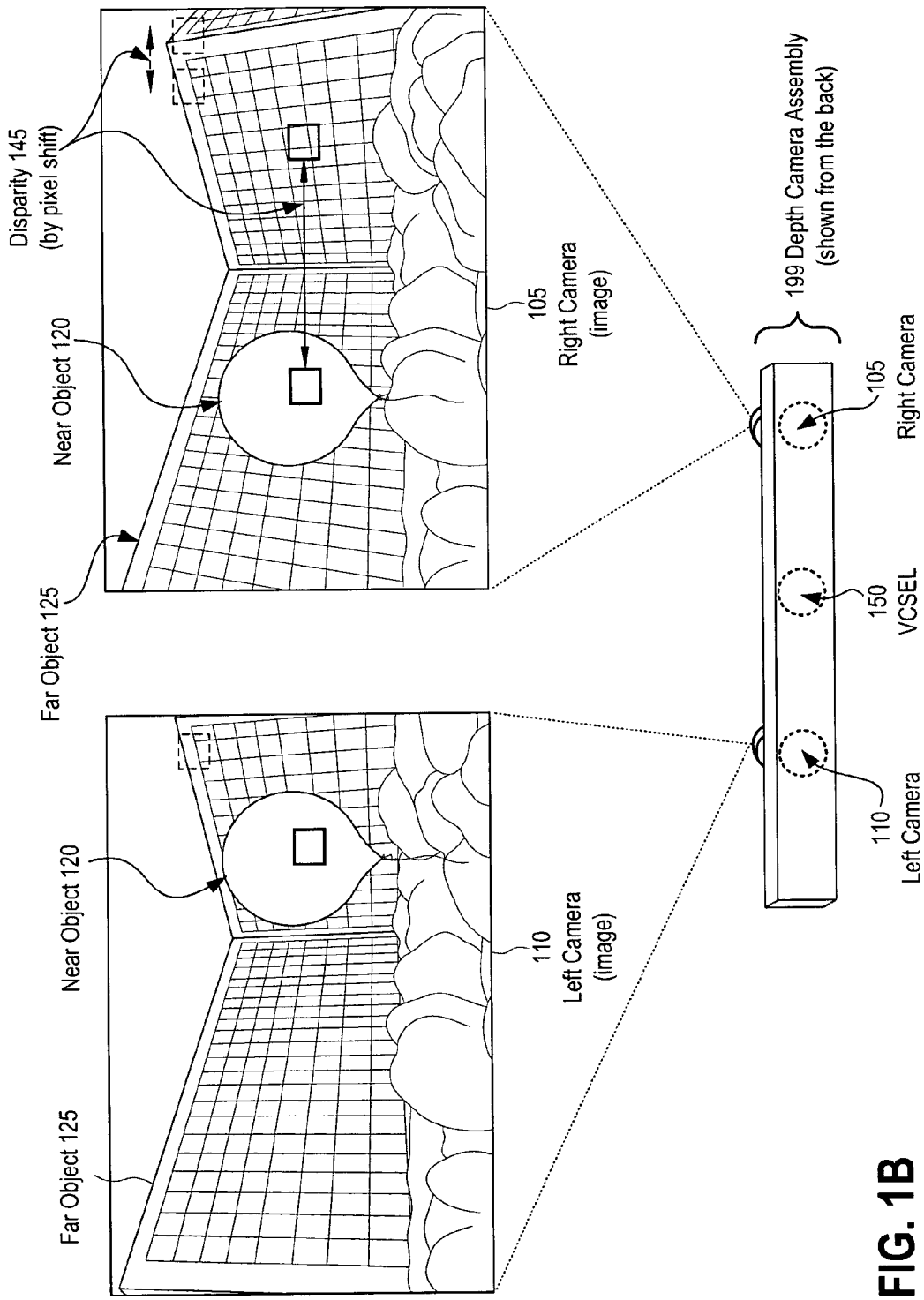
FIG. 1B illustrates another exemplary architecture in accordance with which embodiments may operate.

FIG. 1B illustrates another exemplary architecture in accordance with which embodiments may operate. In particular, there is depicted a far object 125 (e.g., the building in the background) having been captured within the image of the scene by each of the left camera 110 and the right camera 105. Also depicted is a near object 120 (e.g., the balloon) having been captured within the image of the scene by each of the left camera 110 and the right camera 105. Note that the depth camera assembly 199 has been rotated such that it is now facing the scene and the left camera 110 and left image is on the left hand side and the right camera 105 and the right image is on the right hand side.

The farther the object is within the images captured by the right camera 105 and left camera 110, the less the shift and the closer the object is within the images captured by the right camera 105 and left camera 110, the more the shift, thus permitting the depth sensing functionality of the depth camera assembly 199 to determine disparity 145 by pixel shift. The distance or depth to an object in the scene, near or far, therefore depends on how far apart the corresponding points are as established by the disparity 145 for the respective object.

A single image of a scene captured via a single camera will have no depth information whatsoever for an object because given an imaginary ray originating from the focal point of the camera and extending to a point in the image, such as a pixel located on the object of the scene, it is impossible to determine where upon the ray that pixel is located, and thus, it is unknown where the object is positioned within the scene.

There is ambiguity therefore with respect to the position of the object in the scene. Triangulation enables the recovery of this depth information so as to identify the position of an object in a scene, by determining where two rays intersect, one from each of two stereo cameras. Correspondence by a depth sensing camera solves this ambiguity by determining the depth Z (e.g., element 102 of FIG. 1A) to an object. Other three-dimensional (3D) processing methodologies exist besides correspondence based triangulation, such as laser time of flight and projection of coded light.

Nevertheless, using correspondence processing, given two or more images of the same three-dimensional scene, taken from different points of view via the two or more lenses (right camera 105 and left camera 110) of the stereo camera, the correspondence processing identifies a set of points in one image which can be correspondingly identified as the same points in another image by matching points or features in one image with the corresponding points or features in another image.

Thus, by way of example, for every point in the image on the left taken by the left camera 110 the correspondence processing searches for a match in the right image taken by the right camera 105. The pixel-shift needed to achieve a match is called disparity as depicted at element 145. According to such an embodiment, disparity 145 is calculated for all of the pixels in a captured image.

In such a way, the stereo camera having both the left camera 110 and right camera 105 to capture a scene seeks to determine a depth from the position of the camera to, ideally, every pixel of an object (e.g., objects 120 and 125) within a captured image via triangulation which operates by calculating the intersection between two rays, each of the two rays originating from the two different optical systems of the left and right cameras (105 and 110). The term "ray" is in reference to the mathematical object and the term "ray" is not in reference to any projection (e.g., radiating light) by the depth camera, which are referred to herein as projections, beams, laser light, infrared light, VCSEL emissions or VCSEL laser, etc. A ray is a half of a line, that is to say, a straight line starting at an initial point and extending to infinity in a direction and having no curvature, for which there is only one dimension, namely length, without width nor depth. As used herein, the mathematical object "ray" is therefore distinguished from a "beam" which is an optical term.

Figure 1C:
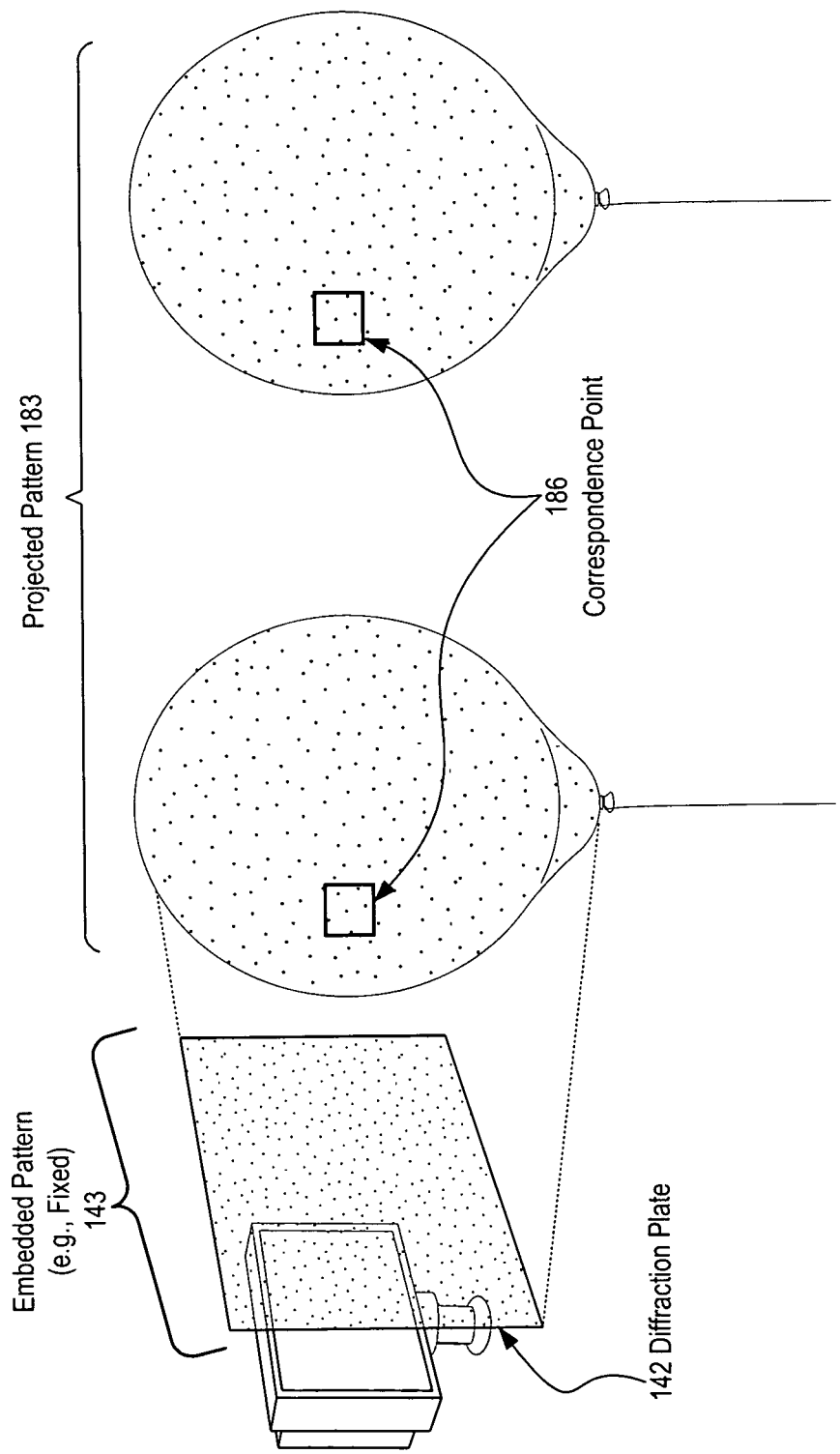
FIG. 1C illustrates another exemplary architecture in accordance with which embodiments may operate.

FIG. 1C illustrates another exemplary architecture in accordance with which embodiments may operate. In particular, there is depicted a correspondence point 186 identified on an object in the scene. An embedded pattern 143 is projected onto the scene resulting in a projected pattern 183 on the object in the scene.

Certain 3D imaging and depth sensing systems have incorporated a laser projector to improve and "assist" with correspondence processing, however, the conventional solutions applied to 3D imaging and depth sensing systems suffer from a variety of drawbacks.

In particular, laser safety is a critical problem with such conventional depth sensing systems due to their use of a single laser source which may emit a light energy at sufficiently high levels to cause injury or blindness in a human subject or other animals. This risk of laser induced injury is made more likely by the fact that cameras have an intended use of taking pictures, quite often, of human subjects, and thus, the likelihood that such a laser is pointed in the direction of a human subject is increased dramatically. Even where such single laser source depth sensing systems are not intended for use around human subjects, such as with drone navigation and autonomously navigating vehicles, the risk remains that the laser energy will strike a human user and thus potentially cause injury or blindness.

A human user (or any animal) is able to look through the VCSEL lens and image the surface of the VCSEL chip, by staring blankly at the camera, in which case the laser light emitted will traverse through the aperture of the lens of the human subject and be focused on the back of the retina. However, unlike a single source edge emitting laser, the VCSEL emits thousands of laser spots or points, but each at drastically lower power. Because each VCSEL or spot has so little power having been spread out over 1000 s or 10,000 s of different VCSELs, each individual spot will be 10× or 100× lower than the eye safety limit, and thus, pose no risk.

Power output for a laser above the eye safety limit is deemed likely to cause damage to the retina of a subject's eye because as the laser light enters the eye and strikes the retina it is focused into a very small spot in the back of the subject's retina, and depending on how much power that spot on the retina is exposed to, the retina may be burned causing anywhere from mild and temporary injury to severe and permanent injury, including blindness.

Because depth sensing systems are utilized in consumer electronics such as cameras, smart phones, tablets, gaming platforms, etc., the eye safety limit of such systems presents an obstacle to improving depth resolution and performance of depth determination for objects more distant because it simply is not safe to increase the power output of the single source edge emitting lasers as doing so increases the risk to human users as well as potentially violates Federal standards as set by the Food and Drug Administration (FDA), thus placing the manufacturer at serious risk of financial liability.

Existing specifications are in place for the use of such lasers and are well known and carefully adhered to by manufacturers incorporating lasers into their systems and products.

Unlike the single source edge emitting lasers used by conventional depth sensing products, the eye safety limit of VCSEL lasers is significantly greater due to the total power being utilized by the VCSEL projector array being divided by thousands of individual lasers making up the VCSEL projector array. Consequently, VCSEL projector arrays may be utilized at higher total power outputs without violating the eye safety limit. For instance, the eye safety limit for VCSEL projector arrays is much higher than conventional single source edge emitting lasers, as much as 10-100 times higher, thus permitting greater power output without risk of injury to human subjects.

With the VCSEL projector array the eye safety limit is greater because any one of the individual beams carries relatively less power than a single source edge emitting laser and because the total power is distributed across many beams and over a significantly larger surface area, thus greatly reducing risk of injury.

With the conventional single source edge emitting lasers, the amount of laser energy hitting the diffraction plate 142 forming the embedded pattern 143 establishes the limit in terms of how much power can be safely output, because the smaller the spot size the more precisely the eye can image the spot in the back of the retina, and thus, the more energy can be received by the retina in a small area leading to potential injury. A hard limit for a given spot size on the diffraction plate 142 by a single source edge emitting laser is therefore established by the spot size.

Conventional single source edge emitting lasers perform well up to approximately 3½ meters, but performance beyond that distance drops off considerably. This is because light projected onto the scene scatters in all direction and enough light does not return to the camera from objects farther than that distance. Depth determination degrades faster still toward the edges of the scene at the far right, far left, top, and bottom portions of the image capture due to poorer angles of reflection back to the camera and the greater distance between the camera and objects toward the edges versus those objects nearer the center of the image capture. Increasing the amount of laser light projected therefore increases range, but violates the laser eye safety limit.

Operating the VCSELs at higher total output power compared to a conventional single source edge emitting lasers therefore aids in greater depth range without violating the laser eye safety limit.

The laser light and resulting projected pattern 183 therefore provides assisted imaging by projecting some texture onto an otherwise featureless scene. For instance, the texturing resolves the problem of aliasing where a point being searched for from a first image to determine correspondence is not unique in a second image, such that the point repeats itself in a number of different locations, therefore making the point's unique location indeterminable and thus confusing the correspondence processing and in turn making it impossible to determine disparity with certainty for that point as there is not a 1:1 correspondence for the point within the two images.

Conventional systems utilizing correspondence derived triangulation suffer from a kind of depth blindness in the presence of a scene which is void of detail. Consider for instance such a conventional camera which captures left and right stereo images of a white wall. Such a system cannot calculate correspondence for such a featureless scene, and as such, is simply unable to perform the subsequent triangulation. Though a white wall may be an extreme example, it is quite common for smaller areas of a captured scene to have portions that lack sufficient detail with which to compute correspondence, due to, for instance, lighting, distance, a lack of pixel density, and so forth, and this inability for such conventional cameras to compute correspondence for those sub-areas of the captured scene result in significant error in the depth computations and degradation of depth determining performance.

Projecting a pattern onto the scene with spots or texture improves accuracy of the depth determination and improves resolution for the depth determination algorithms even for objects or scenes lacking in sufficient natural texture or detail. Therefore, the depth camera as is described herein introduces an active component into the scene to produce active stereo imagery using a VCSEL projector. According to certain embodiments, the projected pattern is dynamically alterable in terms of its total luminosity or brightness as well as its pattern by altering which subset of the total VCSEL projector array's lasers are active and at what power they are active.

In "assisted" or "active" stereoscopic depth camera systems the optical projection system improves performance and coverage. The projector serves to illuminate the scene with a textured pattern so that when the left and right cameras (105 and 110) capture the scene, the 3D circuitry of the depth sensing camera will be able to solve the correspondence problem and find which points in the left image match those in the right image, even for those cases where the natural scene lacks sufficient natural texture, such as is common with walls and tables.

The greater the total power output by the laser, whether a single source edge emitting laser or a VCSEL projector, the brighter each spot will be in the diffraction pattern projected onto the scene. The brighter each spot when projected onto the scene, the greater the contrast and in turn, the more range of the depth sensing system. The farther away an object is within a scene from the camera, the greater the "assisted" light required to be projected from the camera. There must be sufficient laser power output for the light to be projected from the laser originating the light to hit the object in the scene and then to reflect back from the object to the detectors such that the dots of the projected pattern may be utilized to determine correspondence based on where the pixels of the stereoscopic imagery of the scene match and in turn, to determine how far the object is from the camera.

Greater output power of the laser source therefore translates to greater range in terms of measuring the distance of an object accurately, greater resolution, and greater precision.

The projected pattern 183 therefore forms a non-uniform light on objects in the scene to create a texture such that correspondence may be solved by the depth sensing camera.

Problematically, conventional solutions utilize an embedded pattern 143 which is fixed for the particular system and utilize a single source edge emitting laser which has a strict maximum operating output power due to the eye safety limit associated with use of such lasers. Such an embedded pattern 143 may be specially optimized for the specific depth algorithm used to determine the depth by that system, but lacks the ability to adapt to other depth determination algorithms such as may be required for different distances or varying amounts of ambient light in the scene.

Such conventional solutions typically utilize a single laser emitter that transmits the beams through a diffuser, a diffractive optical element, or holographic optical element which in turn results in a far field pattern that has the proper spatially varying illumination pattern as the projected pattern 183 specifically optimized for the particular depth determination algorithm used by that system. However, because the single laser emitter transmits the beams through a diffuser or holographic optical element, it is not possible to alter the projected pattern 183. It further is not possible to alter the contrast or shape of the projected pattern, and as such, the resulting projected pattern 183 may not be suitable for the particular scene, lighting conditions, distance, or selection of available depth determination algorithms which vary from the optimized depth and scene conditions.

Figure 2:
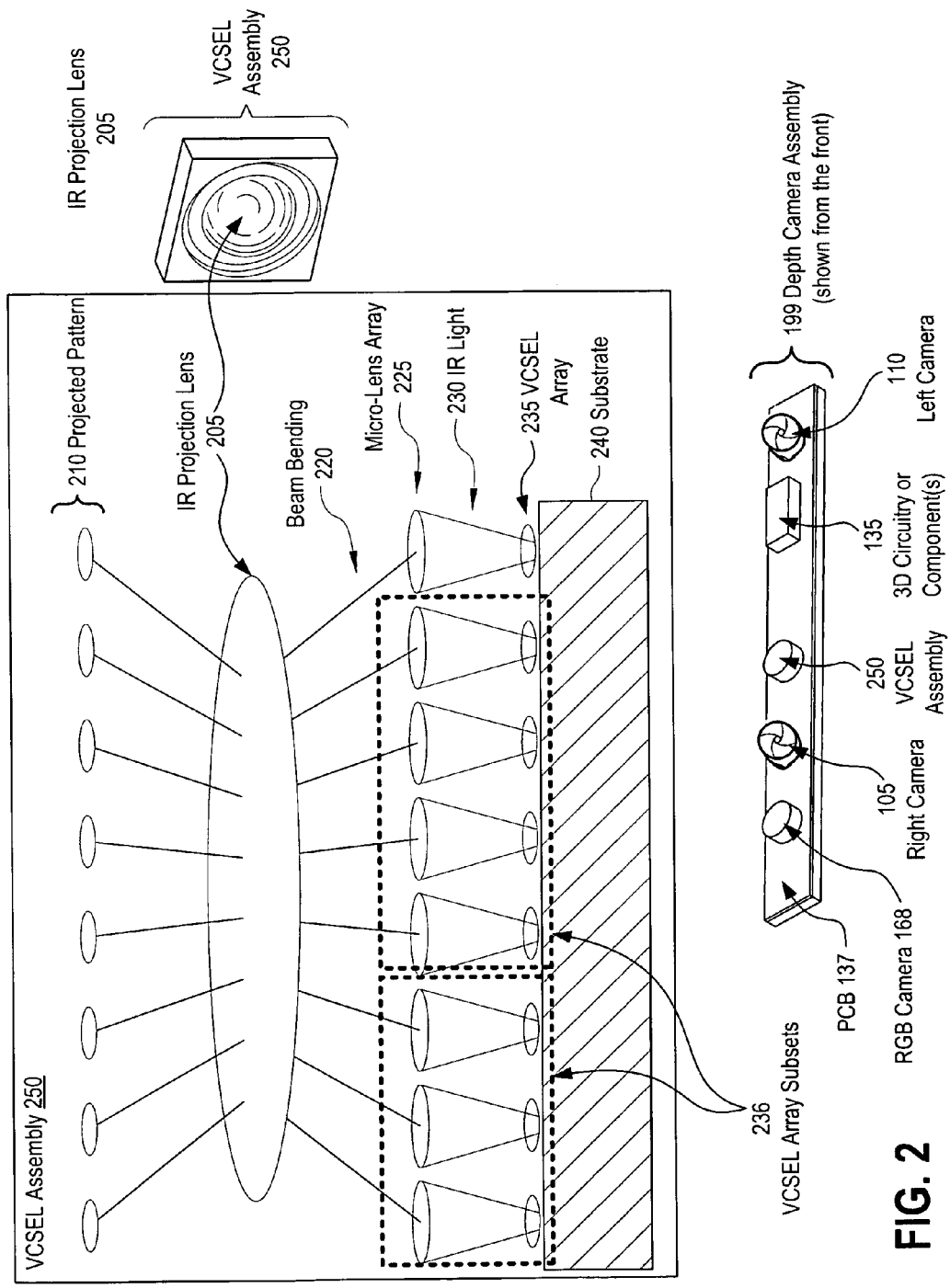
FIG. 2 illustrates an exemplary architecture in accordance with which embodiments may operate.

FIG. 2 illustrates an exemplary architecture in accordance with which embodiments may operate. In particular, depth camera assembly 199 is again depicted (shown from the front) having a printed circuit board 137 upon which there are 3D circuitry or components 135, an RGB camera 168, a right camera 105 and a left camera 110. Further depicted is a VCSEL assembly 250. Depicted via the box above is the VCSEL assembly 250 having a substrate 240, the VCSEL array 235, infrared light (IR light) 230, a micro-lens array 225, an IR projection lens 205, and a projected pattern 210.

The VCSEL array 235 or "Vertical-Cavity Surface-Emitting Lasers" projectors are a type of semiconductor laser diode with laser beam emissions which are perpendicular from the top surface, in contrast to the more conventional single edge-emitting and in-plane semiconductor laser.

Further depicted are the VCSEL array subsets 236 for which the VCSEL array 235 may alter which of the individual laser components of the VCSEL array 235 are active by selecting certain subsets, or banks, or rows, or columns, or zones of the VCSEL array 235 to make active or inactive at any given time to produce varying projected patterns 210.

The VCSEL array assembly 250 operating as an infrared projector with can therefore be utilized to dynamically to enhance such a depth sensing system by altering the resulting projected pattern 210 cast onto a scene whereas prior solutions are limited by the embedded pattern for which they are optimized.

An exemplary VCSEL array 235 chip has thousands (e.g., 1000 s) or tens of thousands (e.g., 10,000 s) of small vertical cavity surface emitting lasers in which the position of the individual VCSEL lasers on the chip are lithographically determined and as such, the pattern may be optimized or arranged into a special pattern according to the needs of the manufacturer for the particular stereo depth sensing algorithm(s) to be used. Moreover, because the VCSEL array 235 contains many individual VCSEL lasers that are controllable as individual units or in batches, banks, VCSEL array subsets 236, etc., a wide variety of patterns may likewise be produced with such projected patterns 210 being dynamically controllable in terms of brightness, contrast, and density, so as to produce the most beneficial illumination for the depth determination algorithm being applied to a particular scene.

In accordance with one embodiment a pattern is specified via X,Y coordinates to establish a desired pattern. For instance, a manufacturer may produce the VCSEL assembly 250 with its VCSEL array 235 established according to the specified pattern.

The micro-lens array 225 bends the beams of light emitted from the VCSEL array 235 such that the beams are more efficiently collected by the IR projection lens 205 as shown. The micro-lens array 225 bends the IR light toward the IR projection lens 205 and thus concentrates the IR light emitted from the VCSEL array 235 onto a smaller optical viewpoint of the IR projection lens 205 by changing the angles of the emitted IR light, and thus lessening the Chief Ray Angle (CRA). In such a way, the micro-lens array 225 changes the functional distance from the center to match the Chief Ray Angle (CRA) of the IR projection lens 205. The IR light emitted from the VCSEL array 235 is then projected out through the IR projection lens 205 thus creating the projected pattern 210 in the scene.

In accordance with one embodiment, use of the VCSEL assembly 250 permits the projected pattern 210 to be changed dynamically during operation by varying which of the individual laser components of the VCSEL array 235 are active by selecting certain subsets, or banks, or rows, or columns, or zones of the VCSEL array 235 to make active or inactive at any given time to produce varying projected patterns 210. Such operation is in contrast to the fixed and non-changeable pattern produced by conventional solutions. For instance, according to such an embodiment, the brightness, contrast, and density of the pattern projected onto the scene via the VCSEL assembly 250 may be altered to suit any one of many available depth determination algorithms or adjusted to suit the real-time lighting conditions or the conditions of the scene, such as a scene with objects far away, objects near to the camera, facial recognition via depth sensing, drone and robot navigation, etc.

Because the projected pattern 210 may be changed dynamically, an appropriate algorithm may be selected to attain the best results possible at a number of different distances from the camera. For instance, depth determination algorithms optimized to near object depth determination may be different than depth determination algorithms optimized to far object depths, and each very likely will require a different projected pattern 210 for optimal performance.

Because conventional depth sensing cameras cannot alter the projected pattern created from the single laser emitter during operation, such conventional cameras must be optimized for near fields performing depth determination of objects very close to the camera or optimized for far fields performing depth determination of objects farther from the camera. Unfortunately, such optimization for near/far fields results in performance which degrades as the object moves from the near field to the far field or vise-versa.

As depicted here, the depth camera assembly 199 further includes an RGB (Red, Green, Blue) camera 168 in accordance with one embodiment. For instance, in such an embodiment, the VCSEL assembly 250 projects the projected pattern 210 onto the scene in an infrared light range and the right camera 105 and left camera 110 operate as detectors to capture the projected pattern 210 from the scene in the infrared light range. Therefore, the RGB camera 168 operates to capture RGB images of the scene in a visible light range.

Figure 3:
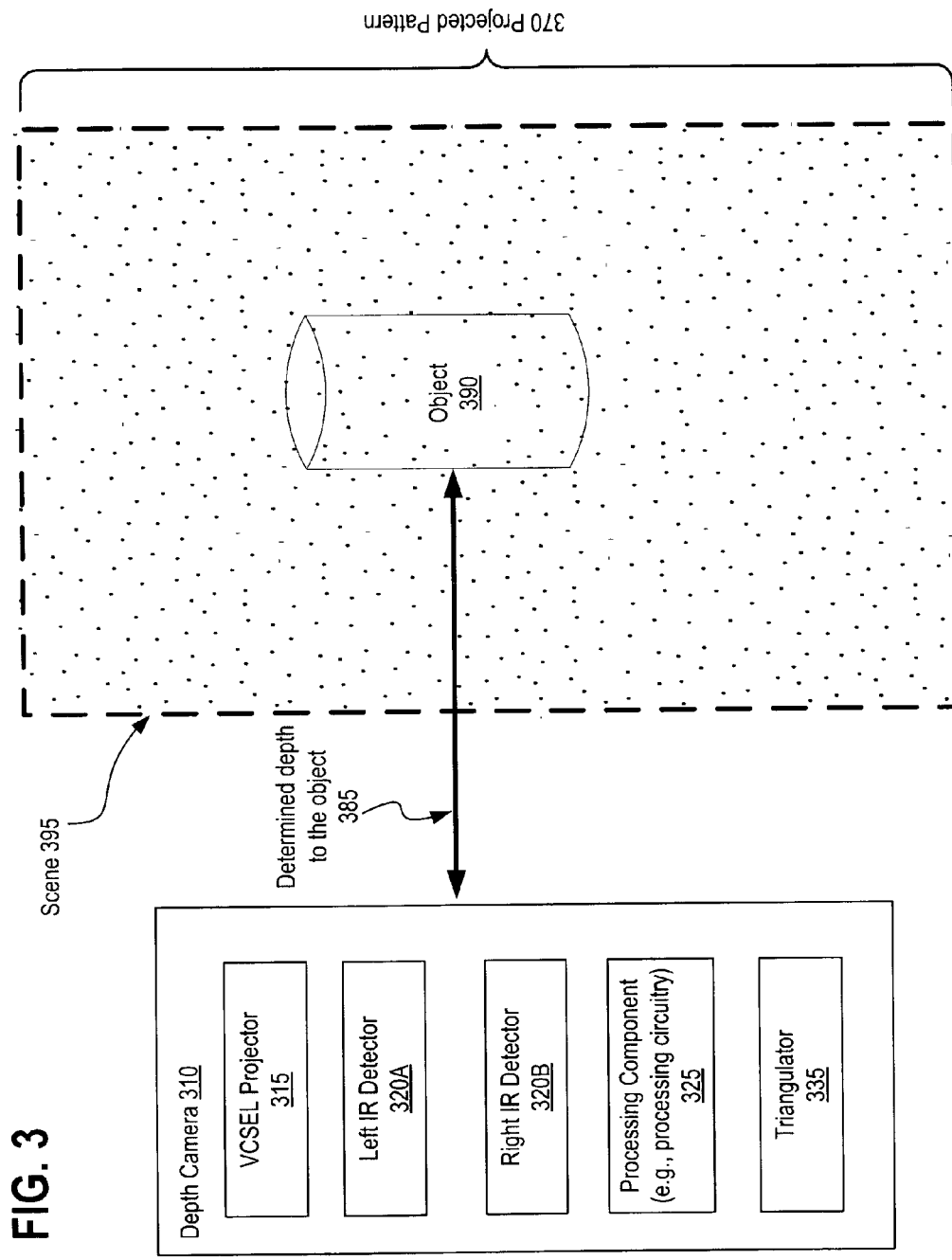
FIG. 3 illustrates an exemplary architecture in accordance with which embodiments may operate.

FIG. 3 illustrates an exemplary architecture in accordance with which embodiments may operate. In particular, there is shown a depth camera 310 which determines depth 385 to an object 390 in a scene 395. The scene 395 is illuminated by the projected pattern 370 projected by the VCSEL projector 315 which may be varied by selecting certain subsets, or banks, or rows, or columns, or zones of the VCSEL array 235 to make active or inactive at any given time to produce varying projected patterns 210 most appropriate for a particular depth determination algorithm.

In accordance with a particular embodiment, such a depth camera 310 includes the VCSEL projector 315 to project the projected pattern 370 onto the scene, a left IR detector 320A to capture a first image of the object 390 having the projected pattern 370 illuminated thereupon and a right IR detector 320B to capture a second image of the object 390 having the projected pattern 370 illuminated thereupon. Processing component 325 operates in conjunction with the triangulator 335 to perform correspondence and triangulation to determine the depth 385 to the object 390 in the scene 395.

Figure 4A:
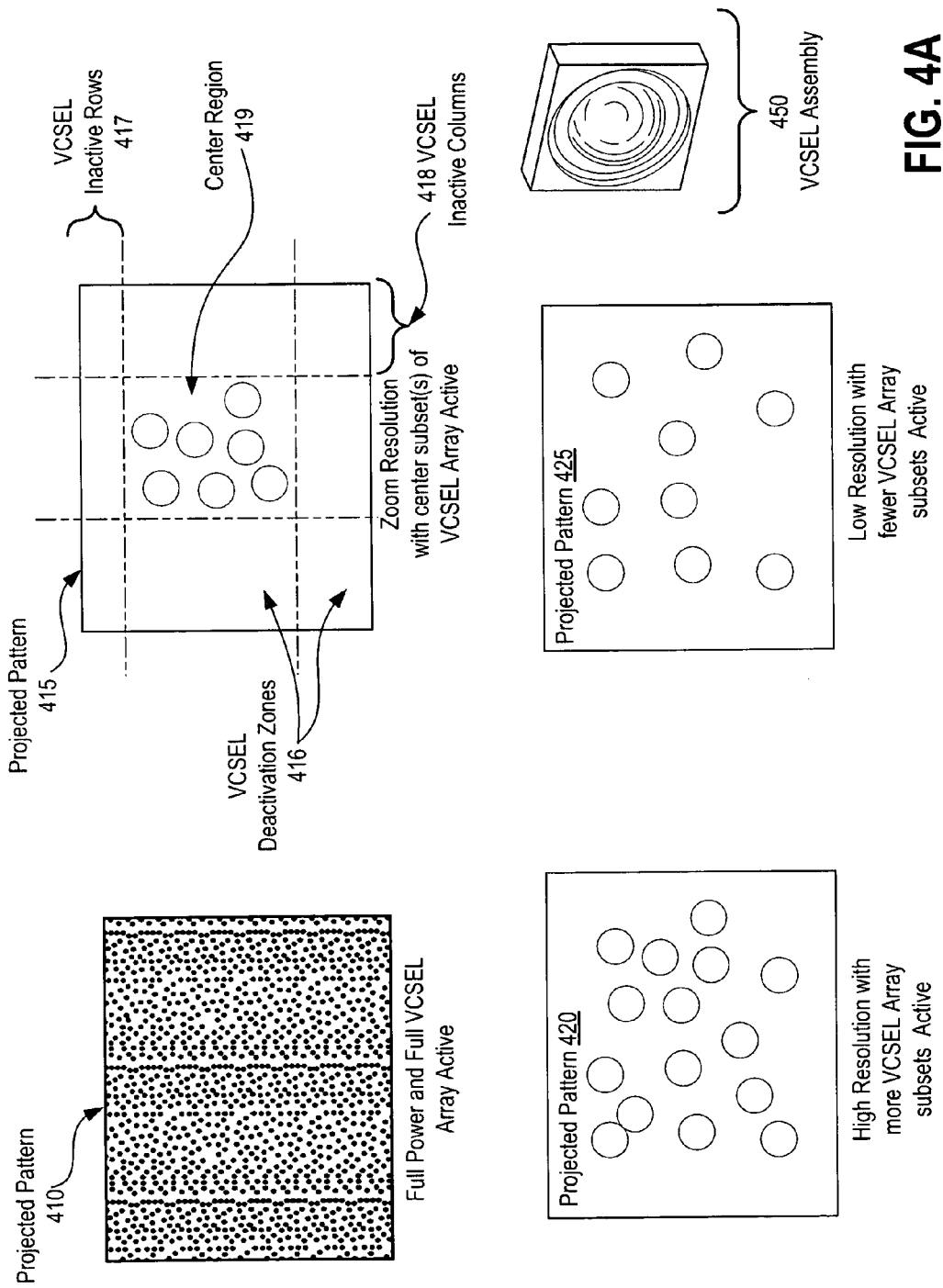
FIG. 4A illustrates exemplary projected patterns which are dynamically alterable in accordance with described embodiments.

FIG. 4A illustrates exemplary projected patterns which are dynamically alterable in accordance with described embodiments. In particular, there is shown projected pattern 410 which projects the dots of the VCSEL assembly 450 VCSEL array at full power and with the full VCSEL array being active. Projected pattern 415 depicts a zoom resolution with center subset(s) of the VCSEL array being active. Further depicted by projected pattern 415 are the VCSEL deactivation zones 416 having quadrants, zones, areas, regions, portions, sections, or specified subsets of the VCSEL array inactive at the time of the projected pattern 415 illuminating the scene. For instance, the VCSEL deactivation zones 416 may be established through VCSEL inactive rows 417 or VCSEL inactive columns 418 as shown, or by other means. In alternative embodiments, VCSEL inactive columns 418 and/or VCSEL inactive rows 417 are interleaved to create alternative projected patterns.

Still further depicted is projected pattern 420 which projects a high resolution projected pattern with more (e.g., such as a majority or most or all) of the subset(s) of the VCSEL array being active. Projected pattern 425 depicts a low resolution with fewer (e.g., such as a minority or a selected minimum) of the subset(s) of the VCSEL array being active.

In such a way, the VCSEL assembly 450 is controllable by activating and deactivating various subsets of the VCSEL array to provide variable control of the projected patterns (410, 415, 420, 425, etc) which are manipulatable at the time of operation in terms of varying brightness, contrast, patterns, density, output power, etc.

For instance, in certain cases a very high-contrast pattern (such as projected patterns 410 and 420) is preferred such as for objects that are far away, or in scenarios where there is a significant amount of ambient light. Conversely, in other cases, a 3D stereoscopic system benefits from a lower resolution projected pattern (such as projected pattern 425), for instance, as with low light environments and for objects that are nearer to the depth sensing camera.

Dynamically controllable VCSEL array subset activation thus permits the depth sensing system to be dynamically optimized at the time of use and to produce the best depth map for the particular conditions present within the scene and for the given resolution being utilized by the depth sensing camera.

Resolution relates to how many pixels will be illuminated and at what resolution the depth sensing camera is able to measure the scene having the objects therein as illuminated by the projected pattern. A depth camera performing a depth measurement at any given resolution will perform better with higher resolution cameras. However, any given resolution generally requires a different projection pattern for optimal performance. With a high resolution camera having more pixels there needs to be a greater quantity of spots within the projected pattern illuminating the scene for optimal performance.

A depth sensing camera has resolution not only in the X and Y direction, but also in the Z direction, which is depth. For any kind of CMOS sensor resolution dictates how finely the delineation between two closely spaced objects may be determined. For instance, given two objects in a scene immediately next to one another, how accurately the camera is able to determine where one ends and the next begins (e.g., correctly identifying the edges) is dependent upon the resolution of the CMOS sensor, which in turn depends on how many pixels the camera is able to capture.

For a high resolution camera a high resolution mode may therefore be more optimal for the camera because a pattern which is highly dense with many spots packed closely together provides good texture information while at the same time remaining discernable as individual spots by the high resolution camera and providing all of the pixels with relevant information. Conversely, a projection pattern having densely packed spots such as the high resolution patterns 415 and 420 may be less than optimal for a lower resolution camera because the spots are too closely packed to be discernable by the low resolution camera which thus causes the low resolution camera to capture a washed out mosaic of spots with poor differentiation, essentially negating the benefits of having the projection pattern just as though there was no active or assisted projection. The low resolution projection pattern 425, however, provides a less densely packed pattern of spots which are discernable by the low resolution camera or by the camera operating in a low resolution mode.

The projection lens 451 thus provides for a high dynamic range such that performance for depth determination of objects near to the camera and performance for depth determination of objects more distant from the camera are equalized in terms of optimization through the dynamic varying of the projected pattern, where as prior solutions required optimization of the projected pattern for a specific distance, with other non-optimized distances suffering by a degradation in depth determination capability.

With conventional solutions, because there is a fixed pattern of dots within the projected pattern the X-Y resolution of the CMOS sensors for such conventional systems will generally then be limited to supporting only a single resolution with optimal performance with variance from that single resolution resulting in a dramatic loss of depth sensing accuracy and range.

Conversely, varying the projection pattern by altering which of the subsets of the VCSEL array are active and inactive it is possible to support a wide range of resolutions for a variety of different formats and use cases. For instance, according to a particular embodiment, the VCSEL array is embodied within an optical system which supports 1920× 1080 for certain uses and additionally supports a scaled down 320×240 resolution for other uses as well as intervening resolutions. The different resolutions require different projection patterns for optimal performance, and as such, optimal performance for such resolution is attained by the depth sensing system by varying the active subsets of the VCSEL array to produce a projected pattern which is determined or specified as being most appropriate for the chosen resolution.

In such a way, optimal performance is achieved by projecting a more dense (e.g., high resolution) projected pattern 420 or a more sparse (e.g., low resolution) projected pattern 425 as appropriate for the given resolution.

According to one embodiment, there are addressable interleaved banks of VCSEL elements. By activating only one or the other of the interleaved banks of VCSEL elements a low resolution projected pattern 425 will result. By activating both of the interleaved banks of VCSEL elements a high resolution projected pattern 420 will result.

In accordance with another embodiment, depth sensing is varied between near and far depth determination in an iterative cycle to produce far depth determination optimized projection patterns and near depth determination optimized projection patterns. Consider for instance an autonomous drone or a self driving vehicle which must, by definition, navigate without the aid of human intervention. Such a system requires disparate depth determination mechanisms, including at least one for far distances to observe the general scene and macro scale obstacles (such as a distant building, landing strip, etc.) and one for near distances to observe with great precision close objects (such as a tree or a moving object such as another vehicle in the near range which risks collision). Prior solutions require either a compromise for depth determination or multiple distinct systems which add to cost, complexity, package size, and power requirements. Conversely, use of the projection lens 451 permits application of depth determination to vary iteratively between optimization for near objects and optimization for far objects, without requiring multiple systems, thus reducing cost, complexity, package size, and power requirements.

Still further, spatially altering the projection pattern provides for range enhancement permitting the depth sensing system perform at a wider continuum of ranges as well as perform with greater accuracy at farther distances. For instance, in accordance with a particular embodiment, such a system addresses banks of VCSEL elements in the center region 419 located at the center of the image thus causing the VCSEL elements in that center region 419 to become active and thus illuminate the projected pattern in a functional "zoom" mode. For instance, during "normal" operational modes it may be that the entirety of the VCSEL array is active and at full power, such as is shown with projected pattern 410, but in a "zoom" mode the VCSEL is made to activate only the center bank of VCSEL elements and thus having VCSEL deactivation zones around the entire perimeter of the center region 419, to the left, right, top, bottom, and corners (e.g., regions, banks, or zones surrounding the center region 419 are turned off or deactivated in the VCSEL array). In such a way, the total power emitted by the depth sensing system may remain the same, yet the power is concentrated into the center region 419 VCSEL elements, thus doubling the output power at that region resulting in greater illumination for that region and thus, greater depth determination ability for the system to farther distant objects in the scene.

In accordance with another embodiment, brightness of the spots within the projected pattern is varied to accommodate changing or different ambient light conditions in the scene. Consider for example a scene in direct sunlight versus a scene indoors. Projected patterns at less than maximum output power for the VCSEL array elements may be sufficiently bright to be observed by the cameras indoors, but when utilized in direct sunlight, may be completely washed out by the brightness of the sun. In such a case, it may therefore be preferable to project each spot produced by the VCSEL assembly 450 at full (100%) brightness high intensity spots, such that the detectors may observe the location of the spots in the projected pattern, even in sunlight. In a related embodiment, where projecting each spot produced by the VCSEL assembly 450 at full (100%) brightness is still not sufficiently bright to overcome ambient light conditions of the scene then the projected pattern 415 may be utilized in a zoom mode in which only a center region 419 of the VCSEL elements are activated and are powered at a maximum permissible power to create fewer but brighter intensity spots to overcome the ambient lighting conditions of the scene. In yet another alternative, the low resolution mode projected pattern 425 may be activated to produce fewer spots distributed throughout the projected pattern yet total operating power is maintained for the VCSEL projected by diverting power away from the deactivated VCSEL array elements, banks, or regions, and applying the diverted power into the VCSEL array elements, banks, or regions activated by the low resolution mode projected pattern 425, thus providing fewer but significantly brighter spots within the projected pattern to overcome the bright ambient sunlight present within the scene.

Figure 4B:
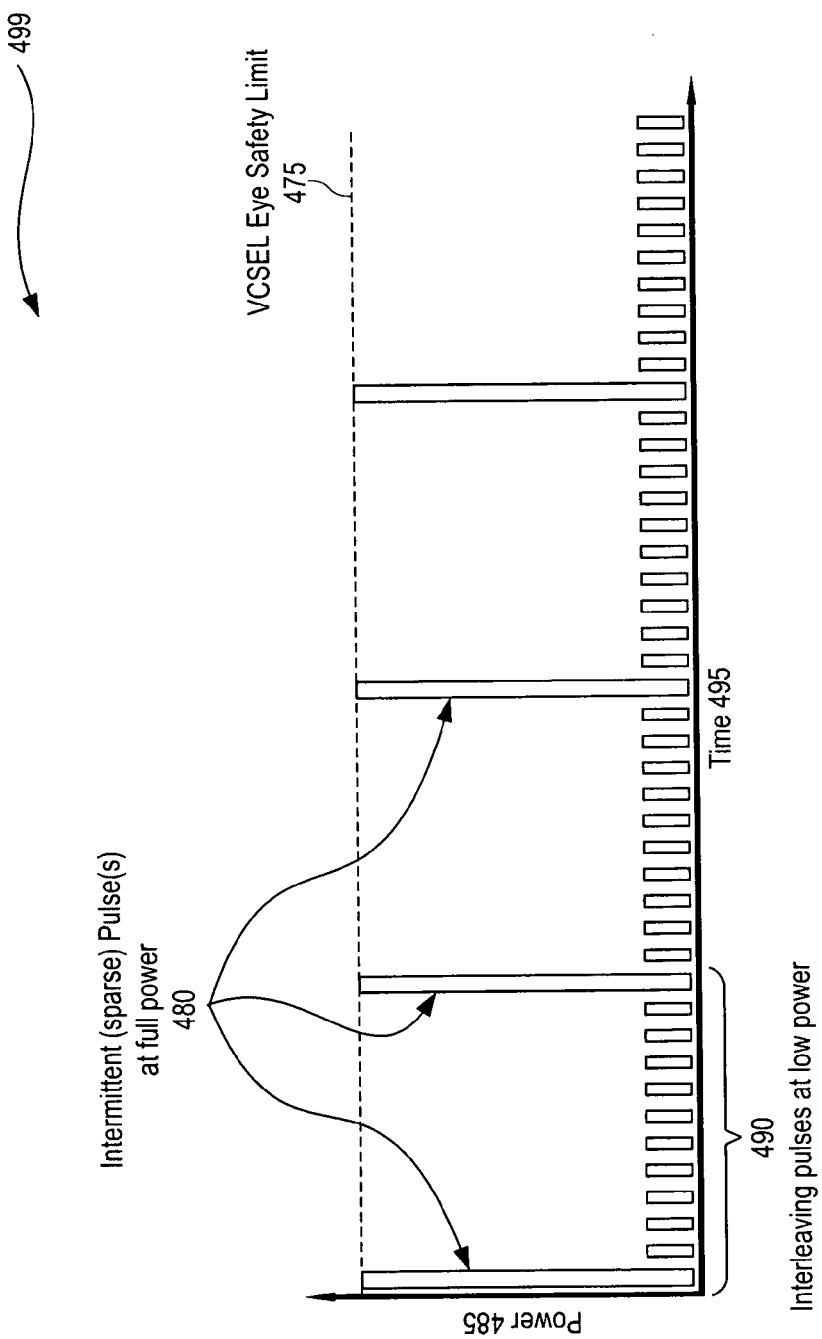
FIG. 4B illustrates intermittent power levels below a VCSEL eye safety limit in accordance with described embodiments.

FIG. 4B illustrates intermittent power levels below a VCSEL eye safety limit in accordance with described embodiments. In particular, there is depicted power 485 on the vertical axis and time 495 on the horizontal axis. The hashed horizontal line at the top of the chart represents the VCSEL eye safety limit 475. As can be seen from the chart, there are intermittent pulses at full power 480 which may be as great as the maximum allowable power up to the VCSEL eye safety limit 475, with intervening pulses at low power 490 significantly below that of the intermittent pulse at full power 480 and well below the VCSEL eye safety limit 475.

In accordance with one embodiment, the VCSEL assembly 450 temporally and spatially modulates the projected pattern illuminating the scene by varying the output power over time or by spatially varying the projected pattern or by a combination thereof.

Theoretically speaking, every single one of the 1000 s or 10,000 s of individual elements of the VCSEL laser array are individually addressable and controllable, however, embodiments described herein temporally and spatially manipulate the projected pattern illuminating the scene by addressing sub-groups, sub-sets, or banks of VCSEL array elements, such as rows, columns, zones, quadrants, sections, regions, etc.

In accordance with a particular embodiment, the projected pattern is spatially interleaved to support multiple varying resolutions, such as those depicted at projected patterns elements 410, 415, 420, and 425 of FIG. 4A.

As noted above, the VCSEL assembly 450 may generate a more powerful optical burst with an array of lasers than is permissible within a laser eye safety limit of a single source edge emitting laser because the VCSEL assembly 450 has a higher VCSEL eye safety limit 475.

A temporally variable "dual throw" operation is therefore depicted for the projected pattern in which the VCSELs are electronically driven with time varying total output power to conform to a temporal pattern such as that which is depicted by the chart 499. With such a configuration the VCSEL array maintains an overall lower power consumption profile by pulsing the VCSEL array with low power, yet still supports a slower update rate in the longer or more distant range for objects farther from the camera by temporally sparsely interleaving high power pulses as depicted by the intermittent pulses at full power 480 amongst the more densely time spaced interleaving pulses at a lower power. Such an approach may be beneficial for depth sensing cameras which require fast, (e.g., 60 Hz-100 Hz) update rates for objects that are near, but only slow, (e.g., 5 Hz) update rates for objects that are farther away. Consider for instance an autonomously navigating vehicle system using depth mapping which needs both near and far depth determination capabilities, but needs less frequent updating for objects farther away and more frequent updating for objects nearer. Such an approach not only reduces cost and complexity due to negating the need for multiple systems but additionally provides a dramatic reduction in power consumption which is an important consideration for such vehicles given that they likely operate on limited battery power.

According to one embodiment the VCSEL assembly 450 temporally and spatially modulates the projected pattern illuminating the scene using interleaved patterns to reduce RMS error (Root-Mean-Square Error or RMSE) and RMS noise.

In accordance with another embodiment, the VCSEL assembly 450 is used to reduce speckle noise in the scene associated with a coherent light source, such as the single laser emitter light source associated with conventional solutions. Speckle noise is known to originate from such single laser emitter light sources which creates interference patterns via coherent illumination of the scene and in turn degrades depth determination capabilities.

Given a coherent light source such as a single laser emitter, two images captured via stereoscopic cameras will exhibit a significant amount of speckle or noise because of interference from the target resulting from the laser light reflecting back from the target. This speckle noise significantly compromises resolution and accuracy attainable in terms of depth to an object and also in terms of high resolution between two closely spaced objects and the ability determine how far apart those two closely spaced objects are from one another.

Such speckle noise is a well known phenomenon and problem with infrared single laser emitter infrared projectors used by conventional solutions. Residual laser speckle adversely affects the RMS error (Root-Mean-Square Error or RMSE) by approximately 30% in conventional depth sensing systems.

In accordance with one embodiment, speckle noise is reduced by the VCSEL assembly 450 by simulating motion into the imaging. In accordance with such an embodiment spatially and temporally interleaved patterns are utilized to reduce RMS noise by switching back and forth between two banks or sub-sets of VCSELs for every frame of exposure on the CMOS sensor. For instance, the projected pattern may be formed from interleaving rows or columns of VCSEL elements representing different sub-sets and the sub-sets are then activated and deactivated over time for each exposure frame to simulate motion within the optimized depth map. For instance, there are not fewer or greater quantities of the VCSEL elements activated or deactivated, rather, there are simply different sub-sets of VCSEL elements activated for any given frame producing the simulated motion to reduce speckle noise.

Spatially and temporally altering the projection pattern is additionally useful to mitigate the appearance of artificial bumps or false artifacts in the depth map due to a single intensity pattern bleeding noise into the imaged depth map. By exposing a temporally varying pattern and subsequently averaging consecutive frames it is possible to reduce the "bumpiness" effects and false artifacts known to be problematic with conventional solutions. Laboratory results observed that "bumps" and false artifacts were reduced in size by approximately two orders of magnitude using such an approach.

In accordance with an alternative embodiment, speckle noise is reduced by the VCSEL assembly 450 by simulating a lateral shifting motion or jitter into the imaging by oscillating the projected pattern back and forth through an activation and deactivation of rows or alternatively columns of VCSEL elements. In such a way the temporally and spatially varying projection pattern by the VCSEL assembly 450 nearly fully eliminates the speckle noise and thus in turn yields a nearly 30% improvement in depth determination accuracy over conventional solutions.

In accordance with one embodiment, speckle noise is reduced by the VCSEL assembly 450 through a flickering of the projected pattern brightness intensity. In accordance with such an embodiment the output power of the VCSEL assembly 450 is iteratively increased and decreased creating a flickering in the brightness of the projected pattern which in turn cancels out speckle noise and improves depth determination accuracy over conventional solutions. Such a flickering is not likely to be directly observable by a human observer for both the fact that the VCSEL assembly 450 beams light in the IR range and additionally because the flickering is far too fast to be seen, however, at small time-scales, if observed, the brightness of the projected pattern on the scene would be observed in the infrared range to iteratively increase and decrease in its brightness intensity.

According to anther embodiment, the temporally variable power output operation depicted yields a lower average output power over time which reduces an operating temperature of the VCSEL assembly and the depth sensing camera. Lower operating temperature is beneficial as increasing amounts of power yield diminishing returns as the input energy is increasingly converted to heat energy rather than light output energy. Moreover, excessive power consumption is especially problematic with battery operated devices due to the limited energy availability.

Figure 5:
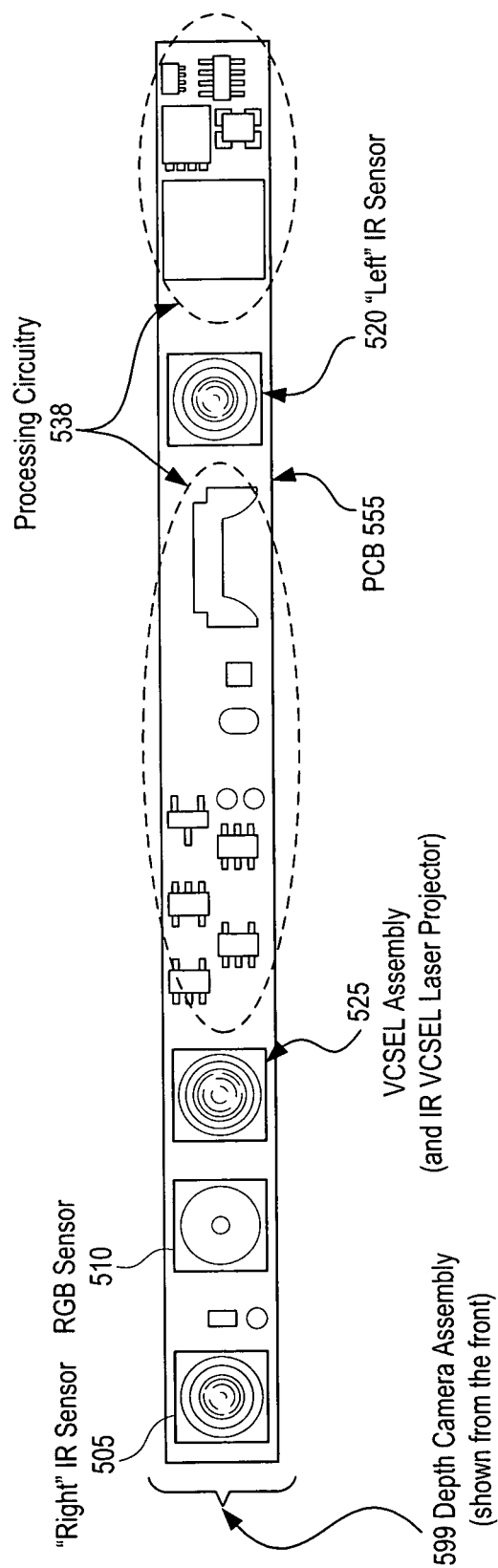
FIG. 5 illustrates an alternative embodiment of a depth camera assembly in accordance with which embodiments may operate.

FIG. 5 illustrates an alternative embodiment of a depth camera assembly 599 in accordance with which embodiments may operate. In particular, depth camera assembly 599 is depicted (shown from the front) having thereupon both a "right" IR sensor 505 and a "left" IR sensor 520 to detect light in the infrared range, such as a projected pattern illuminating a scene as projected by the VCSEL assembly 525 and IR VCSEL laser projector. Further depicted is an RGB sensor 510 and processing circuitry 538 on the printed circuit board (PCB) 555.

Figure 6:
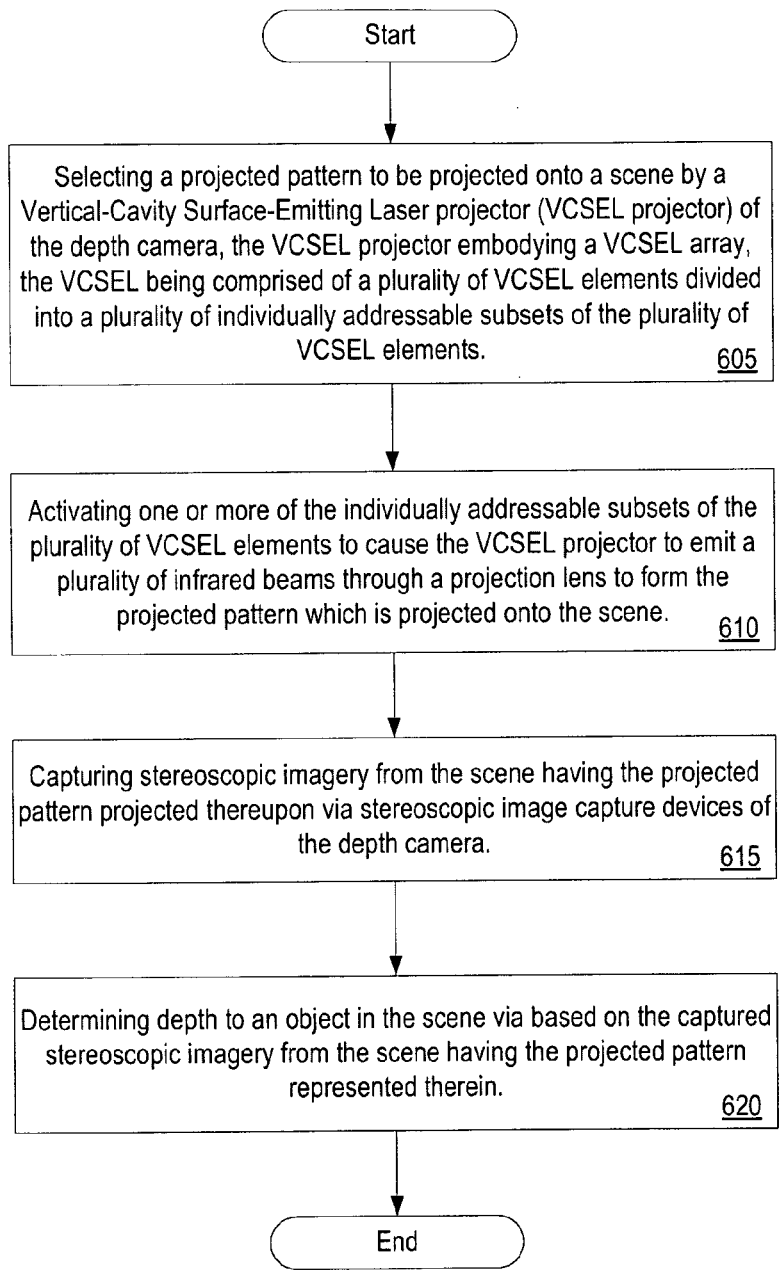
FIG. 6 is a flow diagram illustrating a method for implementing a stereo depth camera using a VCSEL projector with spatially and temporally interleaved patterns in accordance with the described embodiments.

FIG. 6 is a flow diagram illustrating a method 600 for implementing a stereo depth camera using a VCSEL projector with spatially and temporally interleaved patterns in accordance with the described embodiments.

Figure 7A:
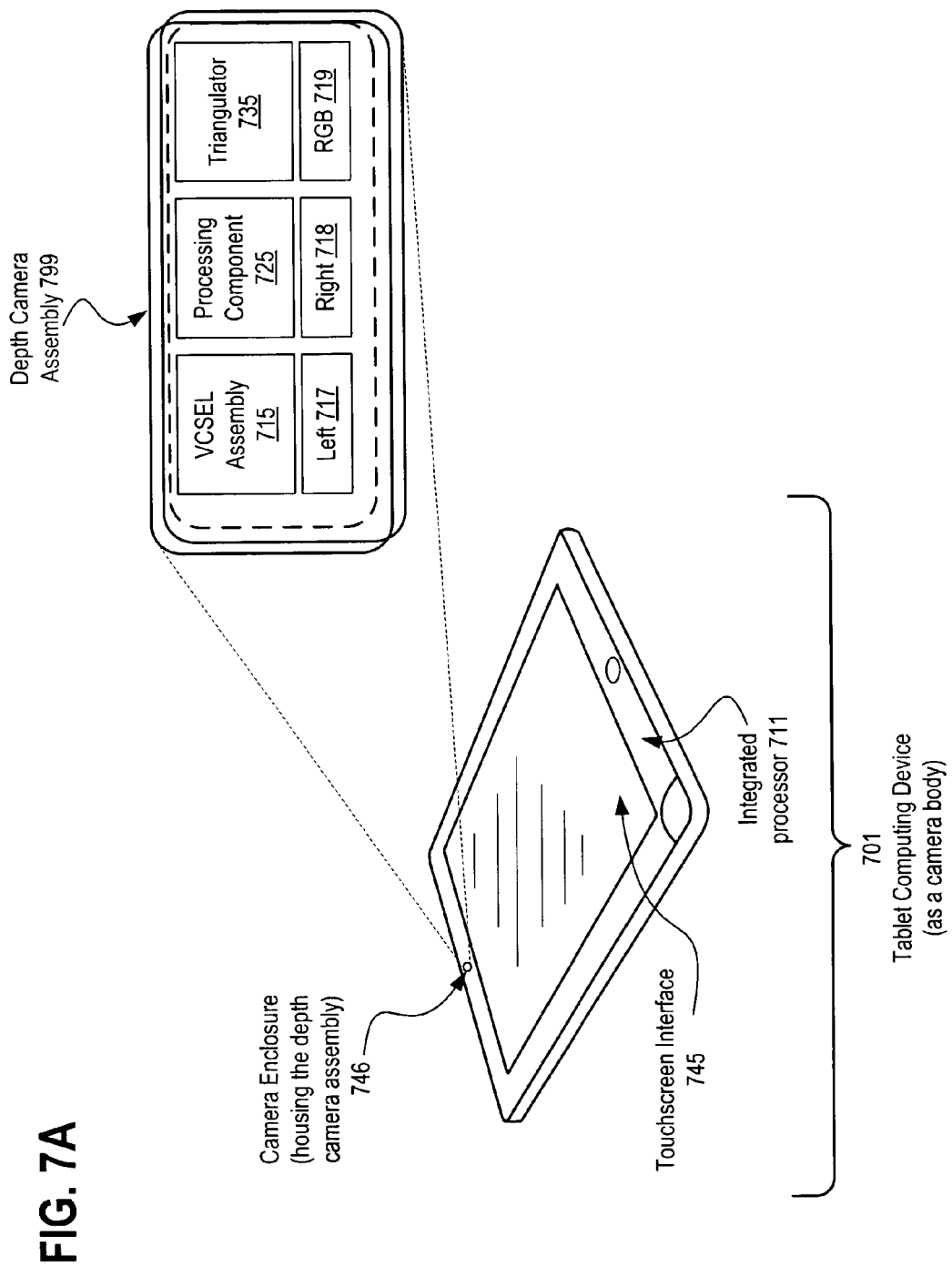
FIG. 7A illustrates an exemplary tablet computing device with a camera enclosure housing the depth camera assembly in accordance with described embodiments.
Figure 7B:
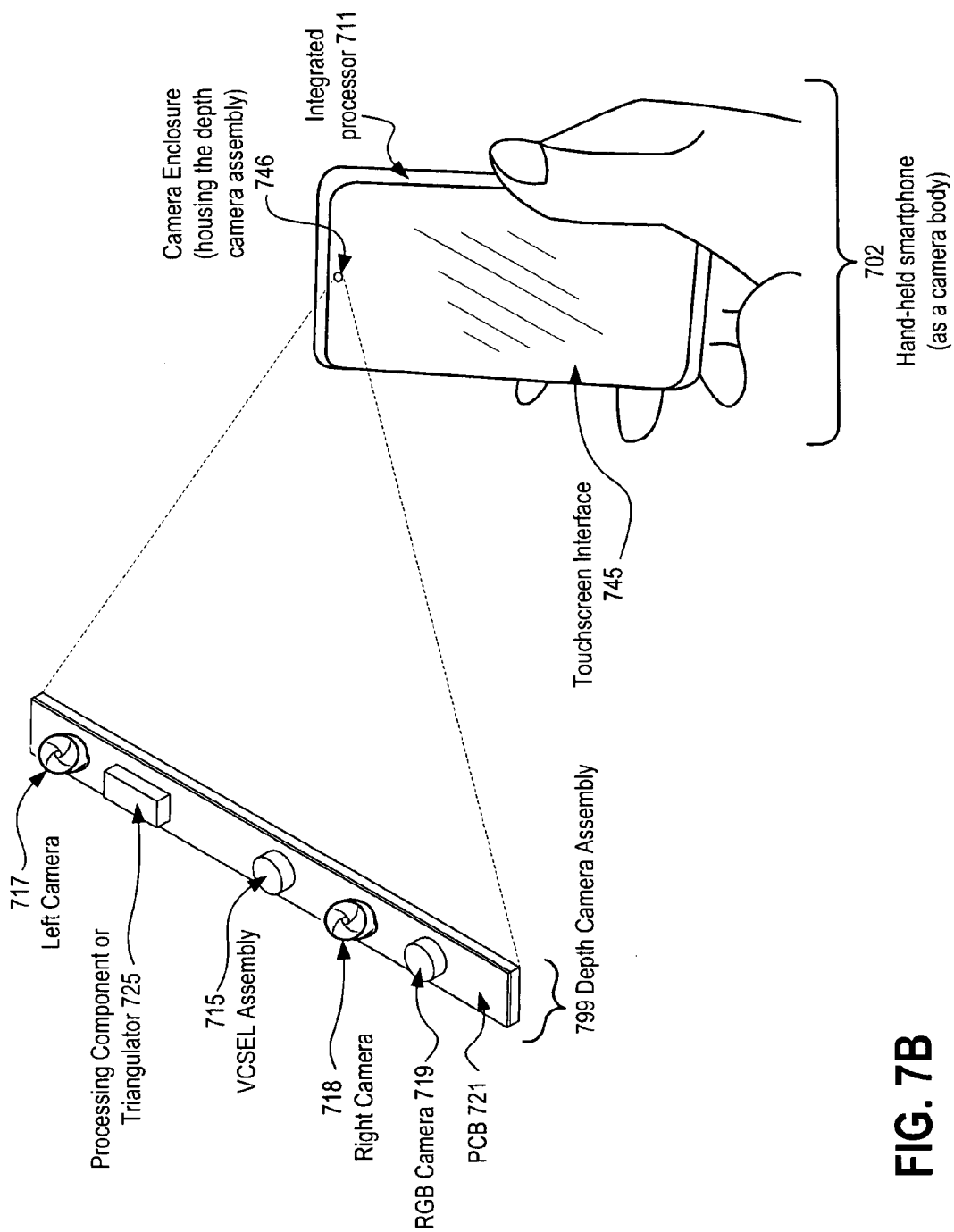
FIG. 7B illustrates an exemplary hand-held smartphone with a camera enclosure housing the depth camera assembly in accordance with described embodiments.
Figure 7C:
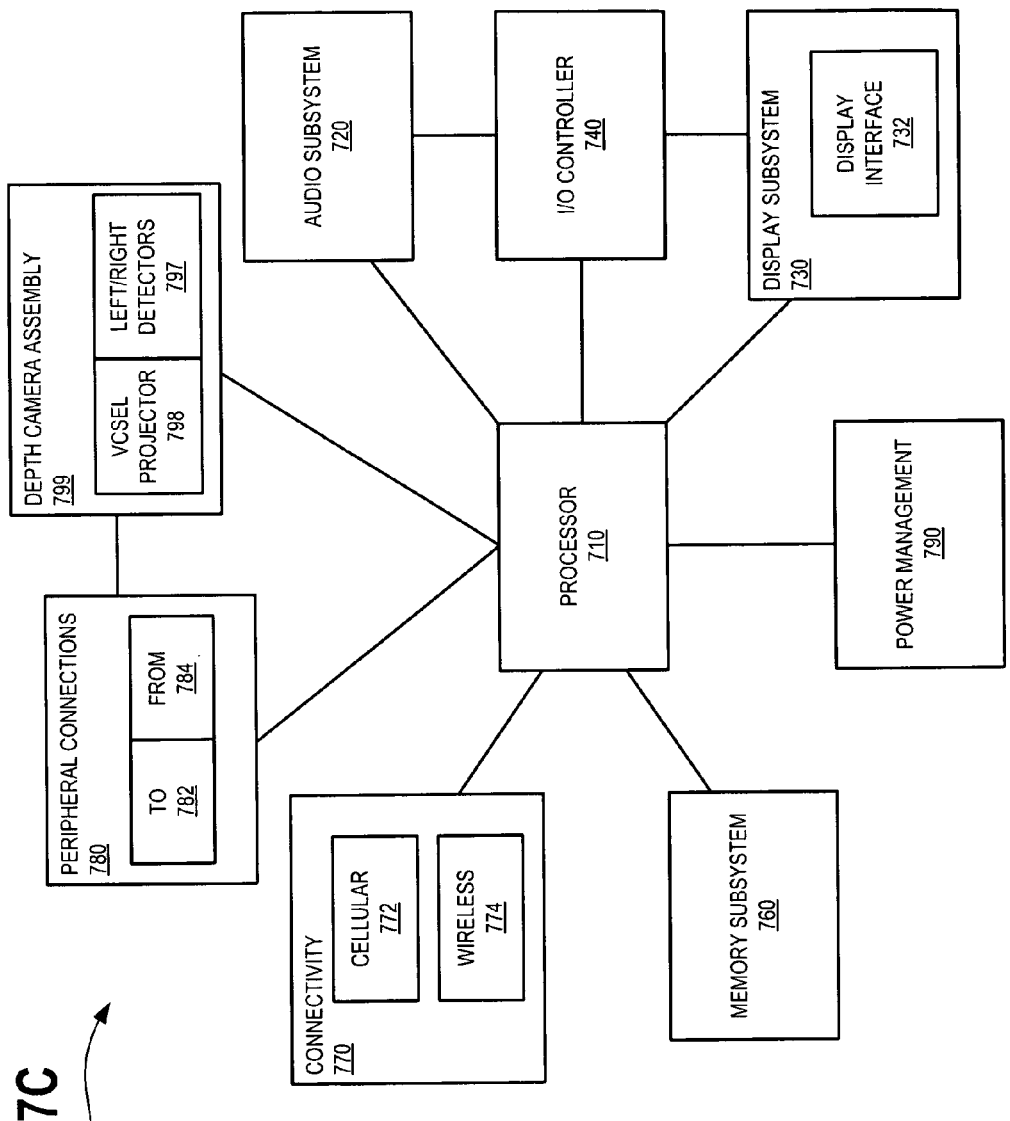
FIG. 7C is a block diagram of an embodiment of tablet computing device, a smart phone, or other mobile device in which touchscreen interface connectors are used.

Some of the blocks and/or operations listed below for method 600 are optional in accordance with certain embodiments. The numbering of the blocks presented is for the sake of clarity and is not intended to prescribe an order of operations in which the various blocks must occur. Method 600 may be performed by processing logic that may include hardware (e.g., circuitry, dedicated logic, programmable logic, microcode, etc.), software (e.g., instructions run on a processing device) to perform various operations such as emanating, steering, projecting, capturing, pulsing, adjusting, outputting, triangulating, focusing, defocusing, normalizing, controlling, analyzing, collecting, monitoring, executing, presenting, interfacing, receiving, processing, determining, triggering, displaying, etc., in pursuance of the systems and methods as described herein. For example, depth camera assemblies 199, depth camera 310, depth camera assembly 599, as depicted at FIGS. 1, 2, 3 and 5, the smart phone or tablet computing devices as depicted at FIGS. 7A, 7B, and 7C, or the machine 800 at FIG. 8, may implement the described methodologies.

With reference to method 600, operations begin at block 605 by selecting a projected pattern to be projected onto a scene by a Vertical-Cavity Surface-Emitting Laser projector (VCSEL projector) of the depth camera, the VCSEL projector embodying a VCSEL array, the VCSEL being comprised of a plurality of VCSEL elements divided into a plurality of individually addressable subsets of the plurality of VCSEL elements.

At block 610 operations include activating one or more of the individually addressable subsets of the plurality of VCSEL elements to cause the VCSEL projector to emit a plurality of infrared beams through a projection lens to form the projected pattern which is projected onto the scene.

At block 615 operations include capturing stereoscopic imagery from the scene having the projected pattern projected thereupon via stereoscopic image capture devices of the depth camera.

At block 620 operations include determining depth to an object in the scene via based on the captured stereoscopic imagery from the scene having the projected pattern represented therein.

In accordance with a particular embodiment of method 600, the one or more of the individually addressable subsets of the plurality of VCSEL elements each includes one of: individually addressable VCSEL deactivation zones; individually addressable VCSEL activation zones; individually addressable quadrants of the VCSEL array; individually addressable VCSEL regions of the VCSEL array; a group of interleaved columns of the VCSEL array addressable individually as a column subset; a group of interleaved rows of the VCSEL array addressable individually as a row subset; and a collection of pre-selected elements of the VCSEL array addressable individually as a collection subset.

In accordance with another embodiment of method 600, the plurality of infrared beams emitted by the VCSEL projector includes light from the VCSEL projector imaging a portion of the VCSEL projector's surface pattern onto the scene corresponding to the one or more of the individually addressable subsets of the plurality of VCSEL elements activated by the processing circuitry.

In accordance with another embodiment of method 600, the VCSEL projector's surface pattern is lithographically determined according to X,Y coordinates specified at a time of manufacture for the VCSEL projector.

In accordance with another embodiment of method 600, the processing circuitry selects the individually addressable subsets based on a resolution density of the stereoscopic image capture devices of the depth camera.

In accordance with another embodiment of method 600, the individually addressable subsets selected by the processing circuitry is based on an optimized depth map corresponding to the resolution density of the stereoscopic image capture devices.

In accordance with another embodiment of method 600, the processing circuitry selects the individually addressable subsets corresponding to a low resolution optimized projected pattern; and in which the low resolution optimized projected pattern illuminates a minority of the VCSEL elements to form a sparsely populated projected pattern.

In accordance with another embodiment of method 600, the processing circuitry selects the individually addressable subsets corresponding to a high resolution optimized projected pattern; and in which the high resolution optimized projected pattern illuminates a majority of the VCSEL elements or all of the VCSEL elements to form a densely populated projected pattern.

In accordance with another embodiment of method 600, the processing circuitry selects the individually addressable subsets corresponding to a zoom resolution optimized projected pattern; and in which the zoom resolution optimized projected pattern illuminates the VCSEL elements in a centered region of the VCSEL array surrounded by VCSEL deactivation zones to the left, right, top, bottom, and in each of four corners of the VCSEL array.

In accordance with another embodiment of method 600, a total output power for the VCSEL array at full operational power is redirected to only the VCSEL elements in the centered region of the VCSEL array causing the projected pattern to exhibit a brighter illumination of the scene in an area corresponding to the VCSEL elements in the centered region.

In accordance with another embodiment of method 600, the processing circuitry selects the individually addressable subsets based on a quantity of ambient light present in the scene.

In accordance with another embodiment of method 600, the ambient light present in the scene is determined to be sunlight; in which the individually addressable subsets activated is decreased and the brightness intensity of the VCSEL elements in the individually addressable subsets activated is increased to compensate for the brightness of the ambient light in the scene.

In accordance with another embodiment of method 600, the ambient light present in the scene is determined to be artificial light; in which the individually addressable subsets activated is increased and in which the brightness intensity of the VCSEL elements in the individually addressable subsets activated is decreased to provide greater depth range in the scene.

In accordance with another embodiment of method 600, the depth camera is embodied within a drone or a self-navigating robot; in which processing circuitry is to iteratively cycle between a near field depth determination algorithm and a far field depth determination algorithm; in which the processing circuitry selects and activates the individually addressable subsets corresponding to the projected pattern optimized for the near field depth determination algorithm; and in which the processing circuitry selects and activates the individually addressable subsets corresponding to the projected pattern optimized for the far field depth determination algorithm.

In accordance with another embodiment of method 600, the stereoscopic image capture devices includes a left infrared camera to capture a left image of the scene having the projected pattern represented therein and a right infrared camera to capture a right image of the scene having the projected pattern represented therein.

In accordance with another embodiment of method 600, processing circuitry determines the depth to the object in the scene by determining correspondence for each of a plurality of points in the captured left and right images and triangulating a distance to each of the plurality of points in the captured left and right images using disparity.

In accordance with another embodiment of method 600, the depth camera is to perform assisted or active stereoscopic depth determination via an optical projection emanating from the VCSEL projector to illuminate the scene with a textured pattern; in which the assisted or active stereoscopic depth determination provides an observable texture in the infrared light range by which the stereoscopic image capture devices of the depth camera capture stereoscopic imagery with the observable texture to improve correspondence determination by the processing circuitry for a scene which lacks sufficient natural texture by which to accurately determine correspondence.

In accordance with another embodiment of method 600, the VCSEL projector includes a micro-lens array to beam steer the plurality of infrared beams emitted by the VCSEL array of the VCSEL projector toward a center of the projection lens before the plurality of infrared beams are projected through the projection lens to form the projected pattern on the scene.

In accordance with another embodiment of method 600, the processing circuitry is to reduce false artifacts and bumps in the scene attributable to noise by iteratively increasing and decreasing the output brightness of the activated individually addressable subsets and subsequently averaging consecutive frames captured of the scene at the increased and decreased brightness.

In accordance with another embodiment of method 600, the processing circuitry is to reduce speckle in the scene by simulating lateral movement through iterative shifting of the projected pattern projected upon the scene as captured by the stereoscopic image capture devices using spatially and temporally interleaved patterns by switching back and forth between activating and deactivating two different individually addressable subsets of the VCSEL array for every frame of exposure on a CMOS sensor of the depth camera.

In accordance with another embodiment of method 600, the VCSEL projector emits the plurality of infrared beams at an output power in compliance with a specified eye safety limit for VCSEL laser emissions.

In accordance with another embodiment of method 600, the VCSEL projector to emit the plurality of infrared beams includes the processing circuitry to electronically control the VCSEL projector with a temporally variable dual throw operation for which an overall lower power consumption profile is maintained by pulsing the VCSEL array with low power VCSEL array beam emissions interleaved by temporally sparse high power VCSEL array beam emissions pulses.

In accordance with another embodiment of method 600, the depth camera is embodied within one of: a gesture control module for a computer; a 3D photography module of a 3D camera; a 3D immersive gaming module of a gaming platform; a face recognition module to perform face recognition based security in-lieu of alphanumerical passwords; a drone navigation control module; a robot navigation control module; a smart phone; and a tablet.

In accordance with another embodiment of method 600, the depth camera further includes an RGB (Red, Green, Blue) camera to capture imagery of the scene in a visible light range.

In accordance with another embodiment there is a non-transitory computer readable storage medium having instructions stored thereupon that, when executed by a processor of a depth camera, the instructions cause the depth camera to perform operations including: selecting a projected pattern to be projected onto a scene by a Vertical-Cavity Surface-Emitting Laser projector (VCSEL projector) of the depth camera; wherein the VCSEL projector embodies a VCSEL array, the VCSEL being comprised of a plurality of VCSEL elements divided into a plurality of individually addressable subsets of the plurality of VCSEL elements; activating one or more of the individually addressable subsets of the plurality of VCSEL elements to cause the VCSEL projector to emit a plurality of infrared beams through a projection lens to form the projected pattern which is projected onto the scene; capturing stereoscopic imagery from the scene having the projected pattern projected thereupon via stereoscopic image capture devices of the depth camera; and determining depth to an object in the scene via based on the captured stereoscopic imagery from the scene having the projected pattern represented therein.

FIG. 7A illustrates an exemplary tablet computing device 701 with a camera enclosure 746 housing the depth camera assembly 799 in accordance with described embodiments. FIG. 7B illustrates an exemplary hand-held smartphone 702 with a camera enclosure 746 housing the depth camera assembly 799 in accordance with described embodiments.

For instance, according to the depicted embodiment of FIG. 7A, the depth camera assembly 799 of the tablet computing device 701 is a camera body for the depth camera assembly having the necessary optics (e.g., lenses) of the VCSEL assembly 715 operating as a projector 715, left 717 and right 718 cameras operating as detectors, as well as the processing component 725, RGB 719 and triangulator 735. The depth camera assembly 799 is integrated within a hand-held smartphone 702 or tablet computing device 701 as a camera body for the depth camera assembly 799. Alternatively, according to the depicted embodiment of FIG. 7B, the depth camera assembly 799 of the hand-held smartphone 702 is a camera body for the depth camera assembly 799 having the necessary optics (e.g., lenses) of the VCSEL assembly 715 operating as a projector 715, the left camera 717 and right camera 718 operating as detectors, and the processing component or triangulator 725. RGB camera 719 and PCB 721 are further depicted.

In such a way, the depth camera assembly 799 may be integrated within a hand-held smartphone 702 or tablet computing device 701 as a camera body for the depth camera assembly 799.

In accordance with one embodiment, the hand held smartphone 702 or tablet computing device 701 having a touchscreen interface 745 integrated therein forms the camera body to which the depth camera assembly 799 is integrated or installed.

FIGS. 7A and 7B depict the tablet computing device 701 and the hand-held smartphone 702 each having a circuitry integrated therein as described in accordance with the embodiments. As depicted, each of the tablet computing device 701 and the hand-held smartphone 702 include a touchscreen interface 745 and an integrated processor 711 in accordance with disclosed embodiments.

For example, in one embodiment, a tablet computing device 701 or a hand-held smartphone 702, includes a display unit which includes a touchscreen interface 745 for the tablet or the smartphone and further in which memory and an integrated circuit operating as an integrated processor are incorporated into the tablet or smartphone, in which the integrated processor is operable in conjunction with the depth camera assembly 799 and its components and circuitry as described herein; the tablet or smartphone and its processing components being further operable to perform pattern projection, projected pattern capture and image processing including determining disparity and correspondence to determine depth information to an object of a scene. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

In accordance with a particular embodiment there is a camera body assembly, including: a camera body; a battery; a display; a processor and a memory to perform logic or instructions; a lens mount assembly, the lens mount assembly, including one or more optical components and Complementary metal-oxide-semiconductor (CMOS) components; and a depth camera assembly Printed Circuit Board (PCB) having affixed thereto: a Vertical-Cavity Surface-Emitting Laser projector (VCSEL projector); wherein the VCSEL projector embodies a VCSEL array, the VCSEL being comprised of a plurality of VCSEL elements divided into a plurality of individually addressable subsets of the plurality of VCSEL elements; processing circuitry to activate one or more of the individually addressable subsets of the plurality of VCSEL elements to cause the VCSEL projector to emit a plurality of infrared beams through a projection lens to form a projected pattern which is projected onto a scene; stereoscopic image capture devices to capture stereoscopic imagery from the scene having the projected pattern projected thereupon; and processing circuitry to determine depth to an object in the scene based on the captured stereoscopic imagery from the scene having the projected pattern represented therein as projected from the VCSEL projector.

According to such an embodiment, the camera body includes one of: a gesture control system, a 3D photography system, a 3D immersive gaming system, a face recognition system to perform face recognition based security in-lieu of alphanumerical passwords, a drone or robot control system, a depth sensing camera system to perform any of stereoscopic imaging depth sensing, a hand-held stand-alone camera, a tablet computing device, and a hand-held smartphone; and in which the depth camera assembly PCB is integrated into the camera body by an Original Equipment Manufacturer (OEM) for the gesture control system, the 3D photography system, the 3D immersive gaming system, the face recognition system, the drone or robot control system, the depth sensing camera system, the hand-held stand-alone camera, the tablet computing device, or the hand-held smartphone.

FIG. 7C is a block diagram 703 of an embodiment of tablet computing device, a smart phone, or other mobile device in which touchscreen interface connectors are used. Processor 710 performs the primary processing operations. Audio subsystem 720 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 710.

Depth camera assembly 799 is depicted as communicably interfaced to the processor 710 and peripheral connections 780. Depth camera assembly 799 includes the VCSEL projector 798 and left/right detectors 797 (e.g., cameras).

Display subsystem 730 represents hardware (e.g., display devices) and software (e.g., drivers) components that provide a visual and/or tactile display for a user to interact with the tablet computing device or smart phone. Display subsystem 730 includes display interface 732, which includes the particular screen or hardware device used to provide a display to a user. In one embodiment, display subsystem 730 includes a touchscreen device that provides both output and input to a user.

I/O controller 740 represents hardware devices and software components related to interaction with a user. I/O controller 740 can operate to manage hardware that is part of an audio subsystem 720 and/or display subsystem 730. Additionally, I/O controller 740 illustrates a connection point for additional devices that connect to the tablet computing device or smart phone through which a user might interact. In one embodiment, I/O controller 740 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 790 that manages battery power usage, charging of the battery, and features related to power saving operation. Memory subsystem 760 includes memory devices for storing information in the tablet computing device or smart phone. Connectivity 770 includes hardware devices (e.g., wireless and/or wired connectors and communication hardware) and software components (e.g., drivers, protocol stacks) to the tablet computing device or smart phone to communicate with external devices. Cellular connectivity 772 may include, for example, wireless carriers such as GSM (global system for mobile communications), CDMA (code division multiple access), TDM (time division multiplexing), or other cellular service standards). Wireless connectivity 774 may include, for example, activity that is not cellular, such as personal area networks (e.g., Bluetooth), local area networks (e.g., WiFi), and/or wide area networks (e.g., WiMax), or other wireless communication.

Peripheral connections 780 include hardware interfaces and connectors, as well as software components (e.g., drivers, protocol stacks) to make peripheral connections as a peripheral device ("to" 782) to other computing devices, as well as have peripheral devices ("from" 784) connected to the tablet computing device or smart phone, including, for example, a "docking" connector to connect with other computing devices. Peripheral connections 780 include common or standards-based connectors, such as a Universal Serial Bus (USB) connector, DisplayPort including MiniDisplayPort (MDP), High Definition Multimedia Interface (HDMI), Firewire, etc.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein including implementing maximum likelihood image binarization in a coded light range camera.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes software 822 and an depth processing 824 functionality which is interfaced with the triangulation circuit 823 capable of performing triangulation processing including correspondence calculation amongst a set of multiple images captured by the left/right IR detectors 880 having projected represented therein a projected pattern emitted by the VCSEL assembly 879. Main memory 804 and its sub-elements are operable in conjunction with processing logic 826 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein including interfacing to the depth camera and/or performing processing on behalf of such a depth camera.

The computer system 800 may further include a network interface card 808. The computer system 800 also may include a user interface 810 (such as a video display unit, a liquid crystal display (LCD), touch screen, or a cathode ray tube (CRT)), an alphanumeric input device 812 (e.g., a keyboard), a cursor control device 814 (e.g., a mouse), and a signal generation device such as an integrated speaker 816. The computer system 800 may further include peripheral device 836 (e.g., wireless or wired communication devices, memory devices, storage devices, audio processing devices, video processing devices, etc.).

The secondary memory 818 may include a non-transitory machine-accessible or computer readable storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A depth camera comprising:
a Vertical-Cavity Surface-Emitting Laser projector (VCSEL projector); wherein the VCSEL projector embodies a VCSEL array, the VCSEL being comprised of a plurality of VCSEL elements divided into a plurality of individually addressable subsets of the plurality of VCSEL elements;
processing circuitry to activate one or more of the individually addressable subsets of the plurality of VCSEL elements to cause the VCSEL projector to emit a plurality of infrared beams through a projection lens to form a projected pattern which is projected onto a scene, the processing circuitry to select the individually addressable subsets of the plurality of VCSEL elements based on a selected depth determination algorithm used to determine depth;
stereoscopic image capture devices to capture stereoscopic imagery from the scene having the projected pattern projected thereupon; and
processing circuitry to determine depth to an object in the scene, using the selected depth determination algorithm, based on the captured stereoscopic imagery from the scene having the projected pattern represented therein as projected from the VCSEL projector.

2. The depth camera of claim 1, wherein the one or more of the individually addressable subsets of the plurality of VCSEL elements each comprises one of: individually addressable VCSEL deactivation zones; individually addressable VCSEL activation zones; individually addressable quadrants of the VCSEL array; individually addressable VCSEL regions of the VCSEL array; a group of interleaved columns of the VCSEL array addressable individually as a column subset; a group of interleaved rows of the VCSEL array addressable individually as a row subset; and a collection of pre-selected elements of the VCSEL array addressable individually as a collection subset.

3. The depth camera of claim 1, wherein the plurality of infrared beams emitted by the VCSEL projector comprises light from the VCSEL projector imaging a portion of the VCSEL projector's surface pattern onto the scene corresponding to the one or more of the individually addressable subsets of the plurality of VCSEL elements activated by the processing circuitry.

4. The depth camera of claim 1: wherein VCSEL projector's surface pattern is lithographically determined according to X,Y coordinates specified at a time of manufacture for the VCSEL projector.

5. The depth camera of claim 1, wherein the processing circuitry to activate one or more of the individually addressable subsets of the plurality of VCSEL elements comprises the processing circuitry to select the individually addressable subsets based on a resolution density of the stereoscopic image capture devices of the depth camera.

6. The depth camera of claim 5, wherein the individually addressable subsets selected by the processing circuitry is based on an optimized depth map corresponding to the resolution density of the stereoscopic image capture devices.

7. The depth camera of claim 1: wherein the processing circuitry to activate one or more of the individually addressable subsets of the plurality of VCSEL elements comprises the processing circuitry to select the individually addressable subsets corresponding to a low resolution optimized projected pattern; and wherein the low resolution optimized projected pattern illuminates a minority of the VCSEL elements to form a sparsely populated projected pattern.

8. The depth camera of claim 1: wherein the processing circuitry to activate one or more of the individually addressable subsets of the plurality of VCSEL elements comprises the processing circuitry to select the individually addressable subsets corresponding to a high resolution optimized projected pattern; and wherein the high resolution optimized projected pattern illuminates a majority of the VCSEL elements or all of the VCSEL elements to form a densely populated projected pattern.

9. The depth camera of claim 1: wherein the processing circuitry to activate one or more of the individually addressable subsets of the plurality of VCSEL elements comprises the processing circuitry to select the individually addressable subsets corresponding to a zoom resolution optimized projected pattern; and wherein the zoom resolution optimized projected pattern illuminates the VCSEL elements in a centered region of the VCSEL array surrounded by VCSEL deactivation zones to the left, right, top, bottom, and in each of four corners of the VCSEL array.

10. The depth camera of claim 9, wherein a total output power for the VCSEL array at full operational power is redirected to only the VCSEL elements in the centered region of the VCSEL array causing the projected pattern to exhibit a brighter illumination of the scene in an area corresponding to the VCSEL elements in the centered region.

11. The depth camera of claim 1: wherein the processing circuitry to activate one or more of the individually addressable subsets of the plurality of VCSEL elements comprises the processing circuitry to select the individually addressable subsets based on a quantity of ambient light present in the scene.

12. The depth camera of claim 11: wherein the ambient light present in the scene is determined to be sunlight; wherein the individually addressable subsets activated is decreased and the brightness intensity of the VCSEL elements in the individually addressable subsets activated is increased to compensate for the brightness of the ambient light in the scene.

13. The depth camera of claim 11: wherein the ambient light present in the scene is determined to be artificial light; wherein the individually addressable subsets activated is increased and wherein the brightness intensity of the VCSEL elements in the individually addressable subsets activated is decreased to provide greater depth range in the scene.

14. The depth camera of claim 1: wherein the depth camera is embodied within a drone or a self-navigating robot; wherein processing circuitry is to iteratively cycle between a near field depth determination algorithm and a far field depth determination algorithm; wherein the processing circuitry selects and activates the individually addressable subsets corresponding to the projected pattern optimized for the near field depth determination algorithm during the cycle for the near field depth determination algorithm; and wherein the processing circuitry selects and activates the individually addressable subsets corresponding to the projected pattern optimized for the far field depth determination algorithm during the cycle for the far field depth determination algorithm.

15. The depth camera of claim 1, wherein the stereoscopic image capture devices to capture stereoscopic imagery from the scene having the projected pattern projected thereupon comprises a left infrared camera to capture a left image of the scene having the projected pattern represented therein and a right infrared camera to capture a right image of the scene having the projected pattern represented therein.

16. The depth camera of claim 15, wherein the processing circuitry to determine the depth to the object in the scene based on the captured stereoscopic imagery from the scene having the projected pattern represented therein comprises the processing circuitry to determine the depth to the object in the scene by determining correspondence for each of a plurality of points in the captured left and right images and triangulating a distance to each of the plurality of points in the captured left and right images using disparity.

17. The depth camera of claim 1: wherein the depth camera is to perform assisted or active stereoscopic depth determination via an optical projection emanating from the VCSEL projector to illuminate the scene with a textured pattern; wherein the assisted or active stereoscopic depth determination provides an observable texture in the infrared light range by which the stereoscopic image capture devices of the depth camera capture stereoscopic imagery with the observable texture to improve correspondence determination by the processing circuitry for a scene which lacks sufficient natural texture by which to accurately determine correspondence.

18. The depth camera of claim 1, wherein the VCSEL projector comprises a micro-lens array to beam steer the plurality of infrared beams emitted by the VCSEL array of the VCSEL projector toward a center of the projection lens before the plurality of infrared beams are projected through the projection lens to form the projected pattern on the scene.

19. The depth camera of claim 1: wherein the processing circuitry is to reduce false artifacts and bumps in the scene attributable to noise by iteratively increasing and decreasing the output brightness of the activated individually addressable subsets and subsequently averaging consecutive frames captured of the scene at the increased and decreased brightness.

20. The depth camera of claim 1: wherein the processing circuitry is to reduce speckle in the scene by simulating lateral movement through iterative shifting of the projected pattern projected upon the scene as captured by the stereoscopic image capture devices using spatially and temporally interleaved patterns by switching back and forth between activating and deactivating two different individually addressable subsets of the VCSEL array for every frame of exposure on a CMOS sensor of the depth camera.

21. The depth camera of claim 1, wherein the VCSEL projector to emit the plurality of infrared beams through a projection lens comprises the VCSEL projector to emit the plurality of infrared beams at an output power in compliance with a specified eye safety limit for VCSEL laser emissions.

22. The depth camera of claim 1, wherein the VCSEL projector to emit the plurality of infrared beams comprises the processing circuitry to electronically control the VCSEL projector with a temporally variable dual throw operation for which an overall lower power consumption profile is maintained by pulsing the VCSEL array with low power VCSEL array beam emissions interleaved by temporally sparse high power VCSEL array beam emissions pulses.

23. The depth camera of claim 1, wherein the depth camera is embodied within one of: a gesture control module for a computer; a 3D photography module of a 3D camera; a 3D immersive gaming module of a gaming platform; a face recognition module to perform face recognition based security in-lieu of alphanumerical passwords; a drone navigation control module; a robot navigation control module; a smart phone; and a tablet.

24. A method in a depth camera, wherein the method comprises:
selecting a projected pattern to be projected onto a scene by a Vertical-Cavity Surface-Emitting Laser projector (VCSEL projector) of the depth camera, wherein the VCSEL projector embodies a VCSEL array, the VCSEL being comprised of a plurality of VCSEL elements divided into a plurality of individually addressable subsets of the plurality of VCSEL elements;
activating one or more of the individually addressable subsets of the plurality of VCSEL elements to cause the VCSEL projector to emit a plurality of infrared beams through a projection lens to form the projected pattern which is projected onto the scene wherein activating the one or more individually addressable subsets of the plurality of VCSEL elements is based on a selected depth determination algorithm used to determine depth;
capturing stereoscopic imagery from the scene having the projected pattern projected thereupon via stereoscopic image capture devices of the depth camera; and
determining depth to an object in the scene via, using the selected depth determination algorithm, based on the captured stereoscopic imagery from the scene having the projected pattern represented therein.

25. The method of claim 24: wherein the depth camera is embodied within a drone or a self-navigating robot; and wherein the method further comprises: iteratively cycling between a near field depth determination algorithm and a far field depth determination algorithm; selecting and activating the individually addressable subsets corresponding to the projected pattern optimized for the near field depth determination algorithm during the cycle for the near field depth determination algorithm; and selecting and activating the individually addressable subsets corresponding to the projected pattern optimized for the far field depth determination algorithm during the cycle for the far field depth determination algorithm.

26. The method of claim 24, further comprising: reducing speckle in the scene by simulating lateral movement through iterative shifting of the projected pattern projected upon the scene as captured by the stereoscopic image capture devices using spatially and temporally interleaved patterns by switching back and forth between activating and deactivating two different individually addressable subsets of the VCSEL array for every frame of exposure on a CMOS sensor of the depth camera.

27. A camera body assembly, comprising:
a camera body;
a battery;
a display;
a processor and a memory to perform logic or instructions;
a lens mount assembly, the lens mount assembly, including one or more optical components and Complementary metal-oxide-semiconductor (CMOS) components; and
a depth camera assembly Printed Circuit Board (PCB) having affixed thereto:
a Vertical-Cavity Surface-Emitting Laser projector (VCSEL projector);
wherein the VCSEL projector embodies a VCSEL array, the VCSEL being comprised of a plurality of VCSEL elements divided into a plurality of individually addressable subsets of the plurality of VCSEL elements;
processing circuitry to activate one or more of the individually addressable subsets of the plurality of VCSEL elements to cause the VCSEL projector to emit a plurality of infrared beams through a projection lens to form a projected pattern which is projected onto a scene, the processing circuitry to select the individually addressable subsets of the plurality of VCSEL elements based on a selected depth determination algorithm used to determine depth;
stereoscopic image capture devices to capture stereoscopic imagery from the scene having the projected pattern projected thereupon; and
processing circuitry to determine depth to an object in the scene, using the selected depth determination algorithm, based on the captured stereoscopic imagery from the scene having the projected pattern represented therein as projected from the VCSEL projector.

28. The camera body assembly of claim 27: wherein the depth camera is embodied within a drone or a self-navigating robot; wherein processing circuitry is to iteratively cycle between a near field depth determination algorithm and a far field depth determination algorithm; wherein the processing circuitry selects and activates the individually addressable subsets corresponding to the projected pattern optimized for the near field depth determination algorithm during the cycle for the near field depth determination algorithm; and wherein the processing circuitry selects and activates the individually addressable subsets corresponding to the projected pattern optimized for the far field depth determination algorithm during the cycle for the far field depth determination algorithm.

29. The camera body assembly of claim 27: wherein the camera body comprises one of: a gesture control system, a 3D photography system, a 3D immersive gaming system, a face recognition system to perform face recognition based security in-lieu of alphanumerical passwords, a drone or robot control system, a depth sensing camera system to perform any of stereoscopic imaging depth sensing, a hand-held stand-alone camera, a tablet computing device, and a hand-held smartphone; and wherein the depth camera assembly PCB is integrated into the camera body by an Original Equipment Manufacturer (OEM) for the gesture control system, the 3D photography system, the 3D immersive gaming system, the face recognition system, the drone or robot control system, the depth sensing camera system, the hand-held stand-alone camera, the tablet computing device, or the hand-held smartphone.

* * * * *